United States Patent
Allan et al.

(10) Patent No.: US 6,674,949 B2
(45) Date of Patent: Jan. 6, 2004

(54) ACTIVE PHOTONIC CRYSTAL WAVEGUIDE DEVICE AND METHOD

(75) Inventors: Douglas C. Allan, Corning, NY (US); Jean-Charles J. C. Cotteverte, Montreal (CA); Sergey A. Kuchinsky, St. Petersburg (RU); Christophe F. P. Renvaze, Avon (FR)

(73) Assignee: Corning Incorporated, Corning, NY (US)

( * ) Notice: Subject to any disclaimer, the term of this patent is extended or adjusted under 35 U.S.C. 154(b) by 169 days.

(21) Appl. No.: 09/886,783

(22) Filed: Jun. 22, 2001

(65) Prior Publication Data

US 2002/0021878 A1 Feb. 21, 2002

Related U.S. Application Data

(60) Provisional application No. 60/269,163, filed on Feb. 15, 2001, and provisional application No. 60/225,488, filed on Aug. 15, 2000.

(51) Int. Cl.$^7$ ................................................ G02B 6/10
(52) U.S. Cl. ........................ 385/129; 385/4; 385/141; 385/142
(58) Field of Search ................ 385/4, 8, 10, 123, 385/129, 141, 142

(56) References Cited

U.S. PATENT DOCUMENTS

| | | | | |
|---|---|---|---|---|
| 5,313,536 A | * | 5/1994 | Rossi et al. | 385/14 |
| 5,389,943 A | | 2/1995 | Brommer et al. | 343/909 |
| 5,802,236 A | | 9/1998 | DiGiovanni et al. | 385/127 |
| 5,973,823 A | | 10/1999 | Koops et al. | 359/322 |
| 6,064,506 A | | 5/2000 | Koops | 359/237 |
| 6,075,915 A | | 6/2000 | Koops et al. | 385/125 |
| 6,101,300 A | | 8/2000 | Fan et al. | 385/27 |
| 6,175,671 B1 | | 1/2001 | Roberts | 385/14 |
| 6,243,522 B1 | | 6/2001 | Allan et al. | 385/123 |
| 6,278,105 B1 | | 8/2001 | Mattia | 250/214.1 |
| 6,310,991 B1 | * | 10/2001 | Koops et al. | 385/14 |
| 6,334,017 B1 | * | 12/2001 | West | 385/123 |

FOREIGN PATENT DOCUMENTS

| | | |
|---|---|---|
| EP | 1 099 963 | 5/2001 |
| WO | WO 98/53351 | 2/1995 |

OTHER PUBLICATIONS

J. Moosburger et al. "Semiconductor Lasers with 2D Photonic Crystal Mirrors Based on a Wet–Oxidized $Al_2O_3$–Mask", IEEE Photonics Tech. Letters, May 2001, vol. 13, No. 5, pp. 406–408.

C. Monat et al. "InP 2D Photonic Crystal Microlasers on Silicon Wafer: Room Temperature Operation at 1.55 micrometer" Electronics Letters, Jun. 7, 2001, vol. 37, No. 12, pp. 764–765.

A. Mekis et al., "High Transmission through Sharp Bends in Photonic Crystal Waveguides", *Physical Reviews Letters*, Oct. 28, 1996, vol. 77, No. 18, pp. 3787–3790.

(List continued on next page.)

*Primary Examiner*—John D. Lee
*Assistant Examiner*—Jennifer Doan
(74) *Attorney, Agent, or Firm*—James V. Suggs

(57) ABSTRACT

An active photonic crystal device for controlling an optical signal is disclosed. The device includes a planar photonic crystal with a defect waveguide bounded on the top and bottom by an upper cladding region and a lower cladding region. An optical signal propagating in the defect waveguide is confined in the plane of the photonic crystal by the photonic bandgap, and in the direction normal to the photonic crystal by the upper clad region and the lower clad region. The propagation of the optical signal in the defect waveguide is controlled by varying the optical properties at least one of the upper clad region or the lower clad region. The variation of the optical properties of the controllable regions may be achieved using a thermo-optic effect, an electro-optic effect, a stress-optic effect, or a mechano-optic effect, or by moving a material into or out of the controllable region.

36 Claims, 19 Drawing Sheets

OTHER PUBLICATIONS

E. Chow et al., "Three-dimensional control of light in a two-dimensional photonic crystal slab", *Letters to Nature*, Oct. 26, 2000, vol. 407, pp. 983–986.

S. Kuchinsky et al., "3D localization in a channel waveguide in a photonic crystal with 2D periodicity", *Optics Communications*, Feb. 15, 2000, vol. 175, pp. 147–152.

H. Benisty et al., "Radiation losses of waveguide-based two-dimensional photonic crystals: Positive role of the substrate", *Applied Physics Letters*, Jan. 31, 2000, vol. 76, No. 5, pp. 532–534.

I. El-Kady et al., "Dielectric Waveguides in Two-Dimensional Photonic Bandgap Materials", *Journal of Lightwave Technology*, Nov. 1999, vol. 17, No. 11, pp. 2042–2049.

C.J.M. Smith et al., "Low-loss channel waveguides with two-dimensional photonic crystal boundaries", *Applied Physics Letters*, Oct. 30, 2000, vol. 77, No. 18, pp. 2813–2815.

M. Loncar et al., "Waveguiding in planar photonic crystals", *Applied Physics Letters*, Sep. 25, 2000, vol. 77, No. 13, pp. 1937–1939.

P. Tran, "Photoni-band-structure calculation of material possessing Kerr nonlinearity", *Physical Review B*, Oct. 15, 1995, vol. 52, No. 15, pp. 10673–10676.

S. Johnson et al., "Guided modes in photonic crystal slabs", *Physical Review B*, Aug. 15, 1999, vol. 60, No. 8, pp. 5751–5758.

X. Zhang et al., "Enlarging a photonic band gap by using insertion", *Physical Review B*, Jan. 15, 2000, vol. 61, No. 3, pp. 1892–1897.

M. Loncar et al. "Design and Fabrication of Silicon Photonic Crystal Optical Waveguides", *Journal of Lightwave Technology*, Oct. 2000, vol. 18, No. 10, pp. 1402–1411.

D. Labilloy et al., "Quantitative Measurement of Transmission, Reflection, and Diffraction of Two-Dimensional Photonic Band Gap Structures at Near-Infrared Wavelengths", *Physical Review Letters*, Nov. 24, 1997, vol. 79, No. 21, pp. 4147–4150.

A. Yu. Sivachenko et al., "Excitations in photonic crystals infiltrated with polarizable media", *Physical Review A*, Jun. 8, 2001, vol. 64, pp. 013809-1 through 013809-8.

* cited by examiner

ACTIVE PHOTONIC CRYSTAL WAVEGUIDE DEVICE AND METHOD

CROSS-REFERENCE TO RELATED APPLICATIONS

This application claims priority under 35 U.S.C § 119(e) to U.S. Provisional Application No. 60/225,488, filed Aug. 15, 2000, which is incorporated herein by reference; and U.S. Provisional Application No. 60/269,163, filed Feb. 15, 2001, which is incorporated herein by reference.

BACKGROUND OF THE INVENTION

1. Field of the Invention

The present invention relates generally to an optical waveguide structure for an optical communication system, and particularly to a planar photonic crystal waveguide for implementing a variety of optical functions in an optical communication system.

2. Technical Background

Photonic crystals are periodic optical materials. The characteristic defining a photonic crystal structure is the periodic arrangement of dielectric or metallic elements along one or more axes. Thus, photonic crystals can be one-, two-, and three-dimensional. Most commonly, photonic crystals are formed from a periodic lattice of dielectric material. When the dielectric constants of the materials forming the lattice are different (and the materials absorb minimal light), the effects of scattering and Bragg diffraction at the lattice interfaces control the propagation of optical signals through the structure. These photonic crystals can be designed to prohibit optical signals of certain frequencies from propagating in certain directions within the crystal structure. The range of frequencies for which propagation is prohibited is known as the photonic band gap.

An exemplary two dimensional photonic crystal which is periodic in two directions and homogeneous in a third is shown in FIG. 1. More specifically, the photonic crystal 10 is fabricated from a volume of bulk material 12 having a square lattice of cylindrical air-filled columns 14 extending through the bulk material in the z-axis direction and periodic in the x-axis and y-axis directions. For normal theoretical analysis and modeling, the photonic crystal 10 has conventionally been assumed to be homogeneous and infinite in the z-axis direction. In this exemplary figure, the plane of the two dimensional photonic crystal is the xy plane.

Another exemplary photonic crystal is shown in FIG. 2. The photonic crystal 15 is similar to the photonic crystal 10, but the cylindrical air-filled columns are disposed in a hexagonal array. A third exemplary two-dimensional photonic crystal is shown in FIG. 3. The photonic crystal 16 is also similar to photonic crystal 10, but consists of an array of dielectric columns 18 in an air background.

The propagation of optical signals in these structures is determined by a variety of parameters, including, for example, radius of the columns, pitch (center-to-center spacing of the columns) of the photonic crystal, structural symmetry of the crystal (e.g. square, triangular, hexagonal, rectangular), and refractive indexes, (such as the index of the material of the columns and the index of the bulk material exterior to the columns). FIG. 4 shows the photonic band diagram for a hexagonal array of air-filled columns 14 in a dielectric bulk material 12. One skilled in the art will appreciate that there is a range of photon frequencies, known as the photonic band gap, for which propagation in the plane of the photonic crystal is prohibited. This photonic band gap, denoted by region 19, is determined by the structure of the photonic crystal, especially by the parameters listed above.

A defect can be introduced into the crystalline structure for altering the propagation characteristics and localizing the allowed modes for an optical signal. For example, FIG. 5 shows a two-dimensional photonic crystal 20 made from a dielectric bulk material with a square lattice of air-filled columns 22 and a linear defect 24 consisting of a row of missing air-filled columns. The band diagram for this photonic crystal structure is shown in FIG. 6. The photonic band gap is denoted by the region 30, while a band of allowed guided modes associated with the defect is denoted by the very thin region 32. The exact position and shape of the region 32 on the graph of FIG. 6 depends upon the photonic crystal parameters. Physically, this means that while optical signals of a given frequency are prohibited from propagating in the bulk photonic crystal 20, they may propagate in the defect region 24. An optical signal, whether a pulse or a continuous wave, traveling in the defect region 24 may not escape into the bulk photonic crystal 20, and so is effectively waveguided in the defect region 24. For a given wavevector, the region 32 only encompasses a narrow band of frequencies. Optical signals of a given wavevector must have frequencies within this narrow band in order to be guided in the defect 24. In the theoretical case of the infinitely thick two-dimensional photonic crystal, light is not confined in the z-axis direction by the photonic crystal structure. While the defect in the above example is a constructed from a row of missing air-filled columns, other defect structures are possible. For example, a defect may consist of one or more columns of a different shape or size than those of the bulk photonic crystal.

Additionally, the crystal structure can be composed of several photonic crystal regions having different parameters, in which case the defect is located at the border between the two regions. Such a structure is shown in FIG. 7, in which the photonic crystal structure 40 has a first photonic crystal region 42 and a second photonic crystal region 44. In the example of FIG. 8, in the first region 42 the cylindrical columns have radius $R_1$ and are arranged with a pitch $P_1$. In the second region, the photonic crystal structure has different parameters, with a column radius of $R_2$ and a pitch of $P_2$. This photonic crystal also has a photonic bandgap, with the possibility of a defect mode for allowing propagation of an optical signal. Because of this defect mode phenomenon and its dependence on the photonic crystal parameters, it is possible to control the propagation of an optical signal in a defect waveguide by controlling the parameters associated with the photonic crystal regions.

Since an optical signal propagating in a defect waveguide is prohibited from propagating in the bulk photonic crystal, it must follow the waveguide, regardless of the shape of the defect waveguide. An advantage of such a structure is that waveguides with a very small bend radius on the order of several wavelengths or even less are expected to have a very low bend loss, since an optical signal is prohibited from escaping the defect waveguide and propagating in the surrounding photonic crystal. FIG. 8 shows the results of a simulation of propagation in a 2D photonic crystal wherein substantially all of the optical signal successfully navigates a 90° bend with a radius of curvature smaller than the wavelength of the optical signal. Likewise, waveguide splitters and combiners are expected to have low radiation losses. FIG. 9 shows a 180° splitter in which nearly 100% transmission is achieved with the optical signal from the input guide 60 perfectly split into the two branches 62 and 64. In this case, a pair of small columns was added in order to reduce the small fraction of light that was backreflected into the input guide 60.

In-plane confinement by a photonic crystal defect waveguide can be confined with refractive confinement in the dimension normal to the photonic crystal to provide a defect channel waveguide. This is most commonly achieved by providing a thin slab of a two-dimensional photonic crystal (known as a planar photonic crystal) having a defect waveguide with lower refractive index materials above and below the photonic crystal waveguide. For example, FIG. 10 shows the structure of a planar photonic crystal defect waveguide 70 with a core layer 71, an underclad layer 72, and an overclad layer 74, all of which include a photonic crystal structure defining the defect channel waveguide. For use herein, an effective refractive index of a material is defined as the volume average refractive index of that material. In order to provide vertical confinement, the effective refractive index of the core layer 71 is higher than the effective refractive indices of the underclad layer 72 and the overclad layer 74. This structure may be made by etching an array of columnar holes into a slab waveguide containing a core layer, an underclad layer, and an overclad layer.

An example of an alternative structure appears in FIG. 11. In this case, only the higher effective refractive index core layer 81 has the photonic crystal structure; the underclad 82 and the overclad 84 are homogeneous. In this structure, which may be fabricated by bonding a thin slab of material containing the 2D photonic crystal structure to a substrate, the substrate serves as the underclad, and the overclad is air Alternative structures have been envisioned wherein a freestanding planar photonic crystal is clad on both sides by air, or wherein both the underclad and overclad are a dielectric material.

FIG. 12 shows another alternative structure, having both the core layer 90 and the underclad layer 92 patterned with a two dimensional photonic crystal structure, and a homogeneous overclad 91. This structure can be made by etching an array of columnar holes into a slab waveguide having an optically homogeneous core layer deposited onto a optically homogeneous underclad layer. In both of these alternative architectures, the upper cladding may be air, or it may be a layer of dielectric material.

In all three architectures, an optical signal is constrained in the defect waveguide vertically by total internal reflection, and horizontally by the photonic band gap. Passive waveguiding has been predicted by optical simulations and demonstrated in experimental systems in all three architectures. Calculations for a planar photonic crystal waveguide have been described in Kuchinsky et al., "3D localization in a channel waveguide in a photonic crystal with 2D periodicity," Optics Communications 175, p. 147–152 (2000), which is hereby incorporated by reference. The calculation method uses a numerical solution of the full vector Maxwell equations, in which the electromagnetic modes are expanded in a sum of plane waves. This approach is well suited to periodic photonic crystals. When the physical system lacks periodicity, for example as in the z-direction of a bulk photonic crystal or the transverse direction of a defect waveguide, then a supercell is employed in which a periodic array of crystals or waveguides is considered. The artificial repeat distance of this supercell is kept large enough to avoid unwanted calculation artifacts. The supercell method is a standard approach that allows periodic band structure computer codes to salve nonperiodic systems. Solution of the fall vector Maxwell equations required, as the simpler scalar approximation gives incorrect results due to the large dielectric/air index. Propagation through sharp defect waveguide bends has also been predicted and experimentally demonstrated.

Active devices may be based on planar photonic crystal defect channel waveguides. For example, an actively controllable Y junction is shown in FIG. 13. The Y junction has an input waveguide 94, a first output waveguide 95, and a second output waveguide 96. The output waveguides are modified by the presence of controllable lattice sites 98 located in the regions 97 of the output waveguides near the branch point and comprising cylindrical columns formed of a ferrite material to which a variably controllable external electromagnetic field may be applied. The locations of the controllable lattice sites conform to the column and row positions of the surrounding lattice region and in effect form an extension of the lattice. Control of the controllable lattice sites 98 is effected such as to vary the refractive index of the ferrite material, and therefore the propagation characteristics of the defect waveguides. The presence of the controllable lattice sites can in effect be turned on or off in variable number to thereby variably control the effective apertures of the output waveguides 95 and 96. This is represented in FIG. 13 by showing only those controlled lattice sites 98 which are turned "on" and which in this example are shown only in the second output waveguide 96. The amount of optical signal coupled into the second output waveguide 96 is thereby controllable by setting the number of sites which are turned on, the remainder of the optical signal being diverted into the second waveguide 96. Active photonic crystal materials and devices with bandgaps in the near infrared, however, would be difficult to fabricate using ferrite materials.

It is also possible to externally control the propagation of an optical signal in a planar photonic crystal defect channel waveguide by varying the refractive index of the bulk material of the planar photonic crystal. The externally applied control may be one of a number of available options including the application of local heating, the injection of electrical current into a semiconductor bulk material, or other suitable optically, electromagnetically or electromechanically induced effects. The photonic crystal lattice is substantially unaffected by this control and continues to serve as a means of confining the optical signal within the waveguide so as to pass through the controlled dielectric region. These types of devices are unattractive in that the photonic crystal must be formed in a thermo-optically, electro-optically, or mechano-optically active material, limiting the choice of device materials and fabrication processes.

Accordingly, photonic crystal waveguide devices which can perform a wide variety of optical transformations and are amenable to a wide variety of materials and manufacturing processes are desired.

SUMMARY OF THE INVENTION

One aspect of the present invention relates to a planar photonic crystal defect waveguide device in which an optical signal is confined in the plane of the photonic crystal by the photonic bandgap, and in the direction normal to the photonic crystal by the upper clad region and the lower clad region, wherein the propagation of light in the waveguide is controlled by varying the optical properties of either the upper clad region or the lower clad region or both.

Another aspect of the present invention relates to a method for controlling an optical signal propagating in such a photonic crystal defect channel by changing the optical properties of either the upper clad region and the lower clad region or both.

Another aspect of the present invention relates to an optical device for controlling an optical signal including a planar photonic crystal structure having a defect waveguide, an upper clad region continuous with the top surface of the defect waveguide, and a lower clad region continuous with the bottom surface of the defect waveguide, wherein at least one of the upper clad region or the lower clad region is a controllable region having a controllable optical property sufficient to modify the optical signal.

Another aspect of the present invention relates to a method for controlling an optical signal including providing a device including a planar photonic crystal structure having a defect waveguide, an upper clad region continuous with the top surface of the defect waveguide, and a lower clad region continuous with the bottom surface of the defect waveguide, wherein at least one of the upper clad region or the lower clad region is a controllable region having a controllable optical property sufficient to modify the optical signal; launching the optical signal into the defect waveguide; and controlling the optical property of at least one of the upper clad region or the lower clad region so as to effect a change in the propagation of the optical signal in the defect waveguide.

The device of the present invention results in a number of advantages. Active planar photonic crystal defect waveguide devices may be designed and fabricated with well-defined guiding characteristics in all three dimensions, and may have modes with zero group velocity. The active planar photonic crystal defect waveguides may be fabricated by standard semiconductor manufacturing techniques. The devices of the present invention do not derive their activity from an active photonic crystal waveguide core, and so may be made from photonic crystals of any standard passive waveguide material. The refractive indices of the upper clad region or the lower clad region or both may be varied in many ways, including by a thermo-optic effect, an electro-optic effect, a mechano-optic effect, or by physically introducing a different material into the clad region. The devices of the present invention may affect various optical transformations, including attenuation, modulation, and switching, all with the reduced device size afforded by the efficiency of tight photonic crystal waveguide bends.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

Figure 1:
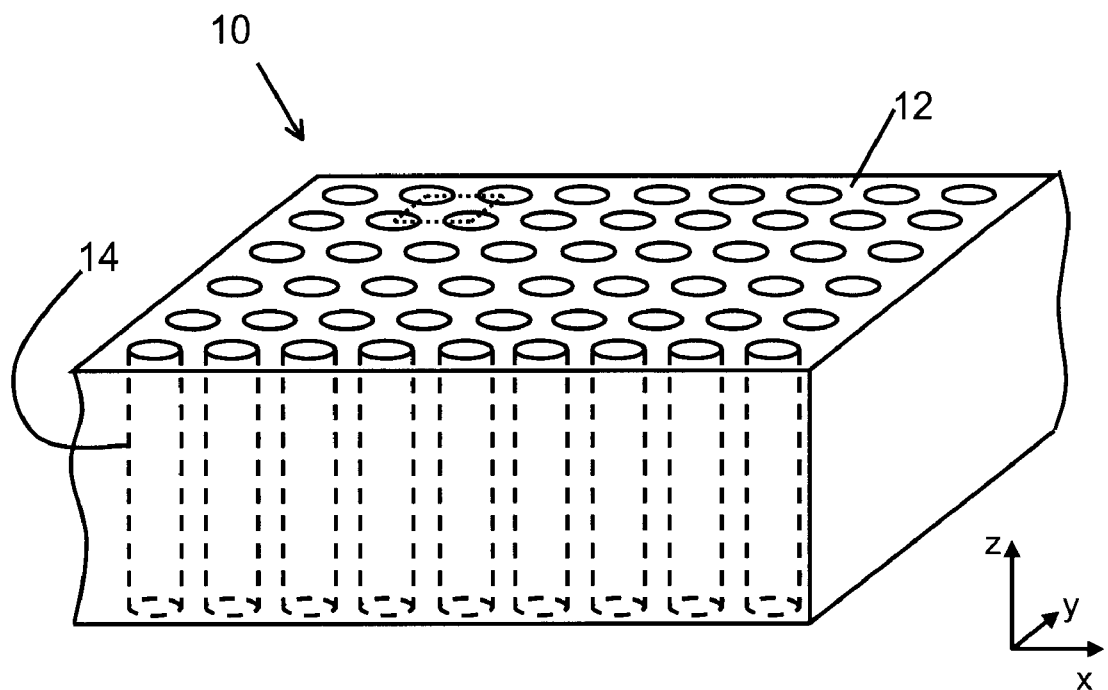
FIGS. 1, 2 and 3 are perspective views showing exemplary prior art two-dimensional photonic crystal structures.
Figure 2:
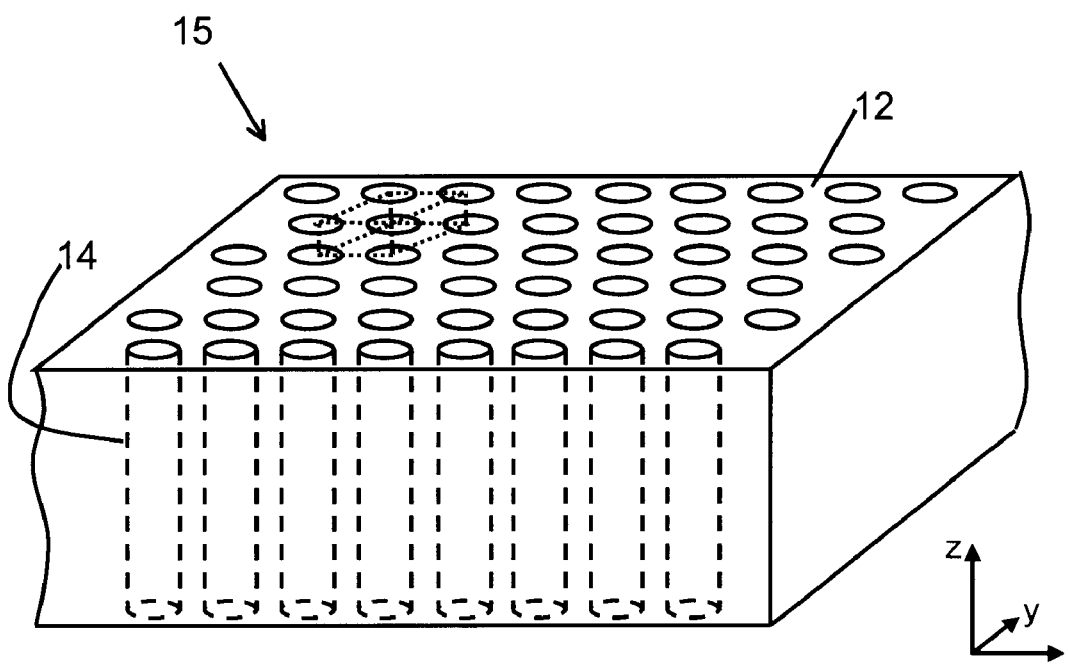
Figure 3:
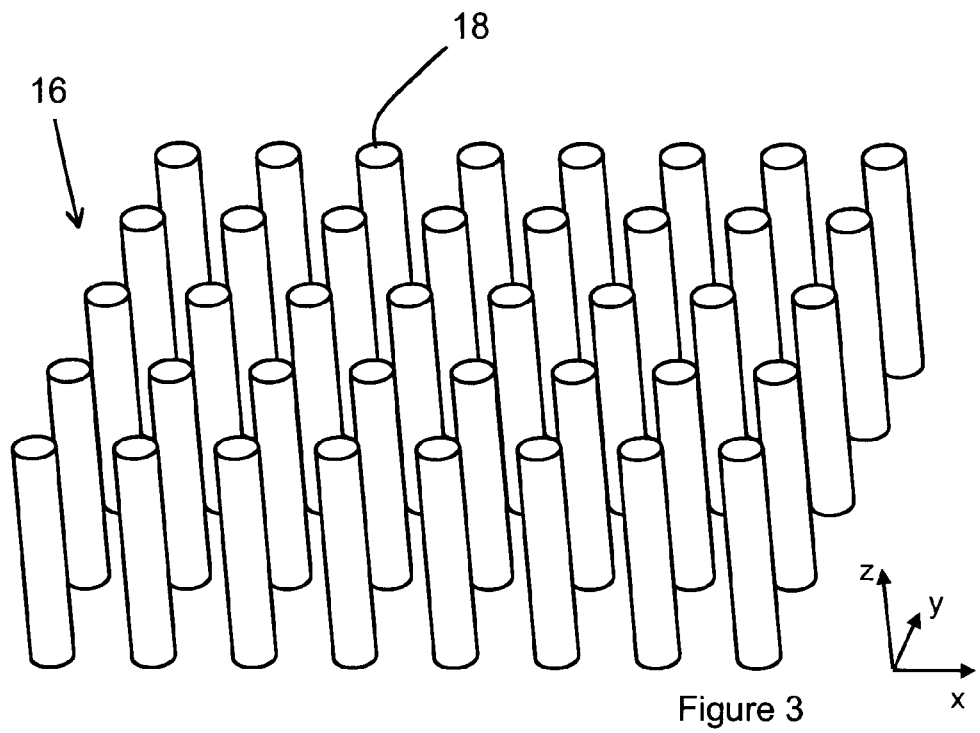

Reference will now be made in detail to the present preferred embodiments of the invention, examples of which are illustrated in the accompanying drawings. Wherever possible, the same reference numerals will be used throughout the drawings to refer to the same or like parts.

Figure 14:
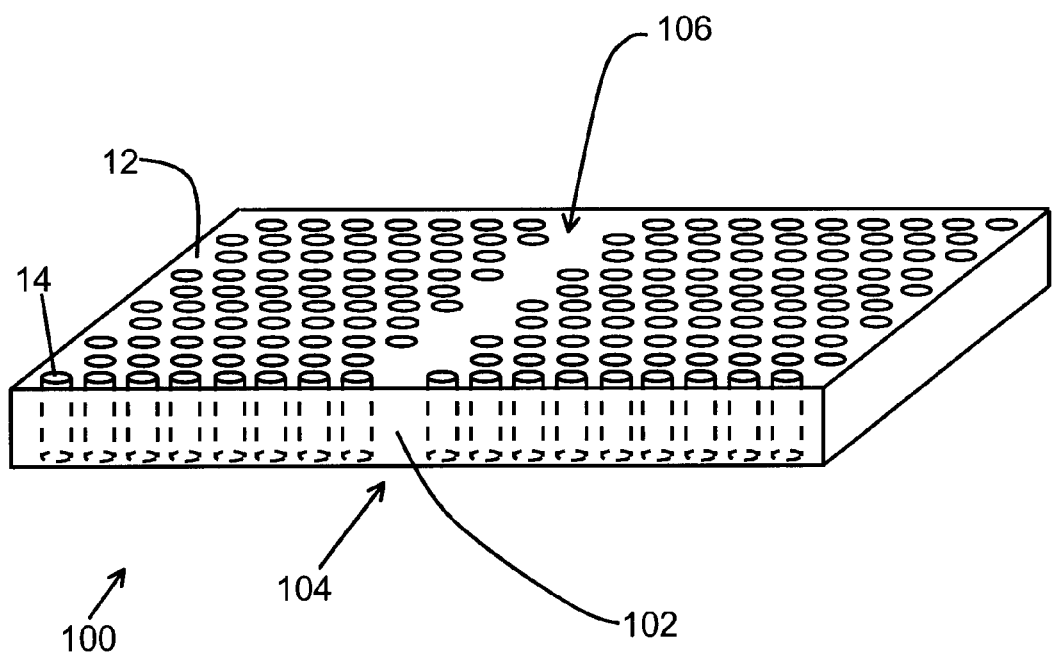
FIG. 14 is a perspective view of a general planar photonic crystal defect waveguide device.

Referring now to FIG. 14, a perspective view of a general planar photonic crystal defect waveguide device is shown. The device consists of a thin slab 100 of planar photonic crystal material, having, for example, air-filled columns 14 disposed in a hexagonal array in a bulk material 12. Alternatively, the geometry of the array may be square, triangular, rectangular, or more complex, depending on the desired in-plane photonic band gap. The bulk material may be any material transparent to the wavelengths of the optical signal. For example, the planar photonic crystal bulk material may be doped silica, undoped silica, silicon, a polymeric organic material, a organic/inorganic hybrid material, an inorganic glass (especially chalcogenide glass), and III–V semiconductor materials such as gallium arsenide. The planar photonic crystal may be made by any method used in the art, such as photolithographic patterning followed by etching. There is a defect waveguide 102 in the photonic crystal slab 100. A lower clad region 104 is a volume of space contiguous with the bottom surface of the defect waveguide 102. This lower clad region 104 is on the order of microns thick, and encompasses the evanescent wave of an optical signal propagating in the defect waveguide 102. The lower clad region 104 may contain any material, including a substrate material, a deposited layer, or air, which may or may not itself be patterned with a photonic crystal structure. An upper clad region 106 is a volume of space contiguous with the top bottom surface of the defect waveguide 102. This upper clad region 106 is also on the order of microns thick, and encompasses the evanescent wave of an optical signal propagating in the defect waveguide 102. The upper clad region may contain any material, including a substrate material, a deposited layer, or air, which may or may not itself be patterned with a photonic crystal structure. In operation of the device, the propagation of an optical signal is controlled by varying an optical property of the lower clad region 104, the upper clad region 106, or both clad regions 104 and 106.

Figure 15:
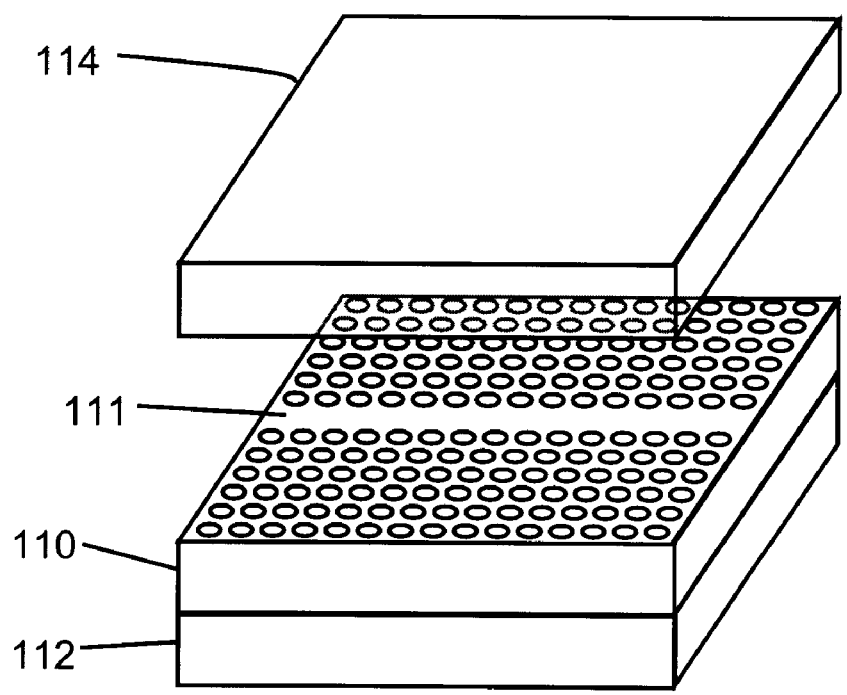
FIG. 15 is a perspective view of a planar photonic crystal defect waveguide device with a movable slab of material in a rest switch state.
Figure 16:
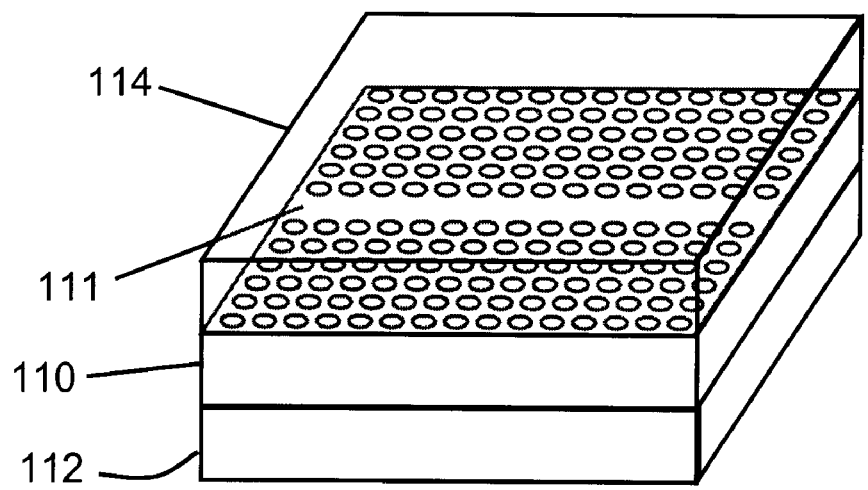
FIG. 16 is a perspective view of a planar photonic crystal defect waveguide device with a movable slab of material in an actuated switch state.

An exemplary planar photonic crystal defect waveguide device is shown in FIG. 15. A planar photonic crystal slab 110 with a defect waveguide 111 is formed on a substrate 112, preferably using known semiconductor manufacturing techniques. The substrate 112 is transparent to the wavelength of interest and of a lower effective refractive index than effective refractive index of the photonic crystal slab 110. In this case, the lower clad region 104 contains substrate material. Depending on the fabrication process, the material in the lower clad region 104 may or may not be patterned with the photonic crystal structure. As fabricated, the upper clad region 106 contains air. As part of the present invention, the defect mode, and therefore the propagation of an optical signal in the defect waveguide 111, may be changed by changing the refractive index of the upper clad region 106. One technique for achieving this is to position a plain slab of material 114 near but outside of the upper clad region 106. The material of the slab 114 may be any material with a desired effective refractive index, for example doped silica, undoped silica, silicon, a polymeric organic material, a organic/inorganic hybrid material, an inorganic glass, and III–V semiconductor materials such as gallium arsenide. The effective refractive index of the upper clad region 106 in the rest switch state shown in FIG. 15 is that of air. In the actuated switch state shown in FIG. 16, the slab 114 is moved into the upper clad region, which increases the effective refractive index of the upper clad region 106 by an amount depending on the effective refractive index of the slab 114 and its protrusion into the upper clad region 106. The change in effective refractive index of the upper clad region will perturb the defect mode, modifying the propagation of the optical signal through the defect waveguide 111. The closer the slab 114 is placed to the top surface of the defect waveguide 111, the larger the perturbation of the defect modes will be. This controllable perturbation of the defect modes will serve to modify the propagation of an optical signal through the planar photonic crystal defect waveguide 111. As such, actuation of the slab 114 controls the propagation of an optical signal in the defect waveguide 111.

Figure 17:
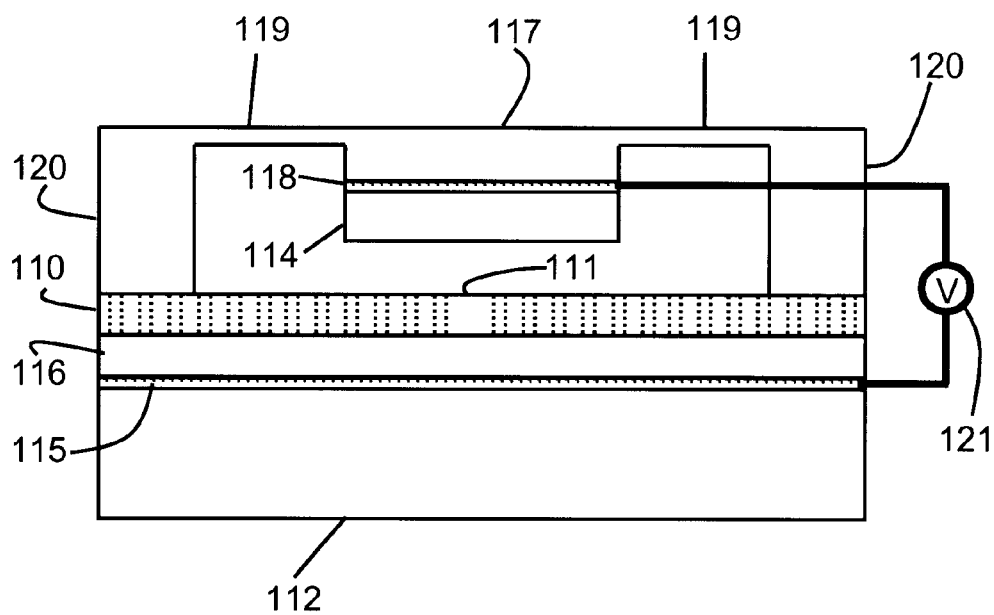
FIG. 17 is a cross-sectional view of a planar photonic crystal defect waveguide device with a movable slab of material coupled to a MEMS actuator in a rest switch state.
Figure 18:
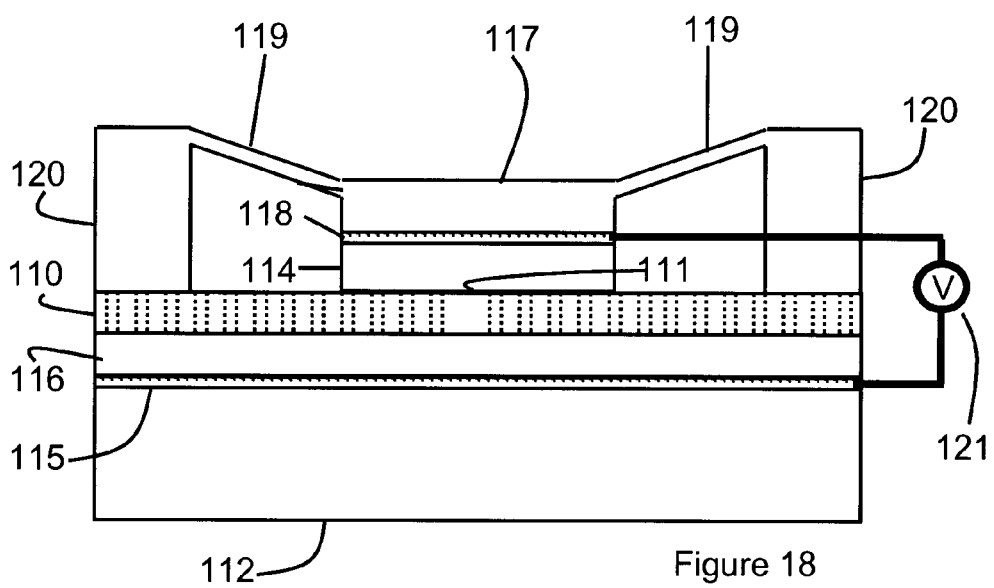
FIG. 18 is a cross-sectional view of a planar photonic crystal defect waveguide device with a movable slab of material coupled to a MEMS actuator in an actuated switch state.
Figure 19:
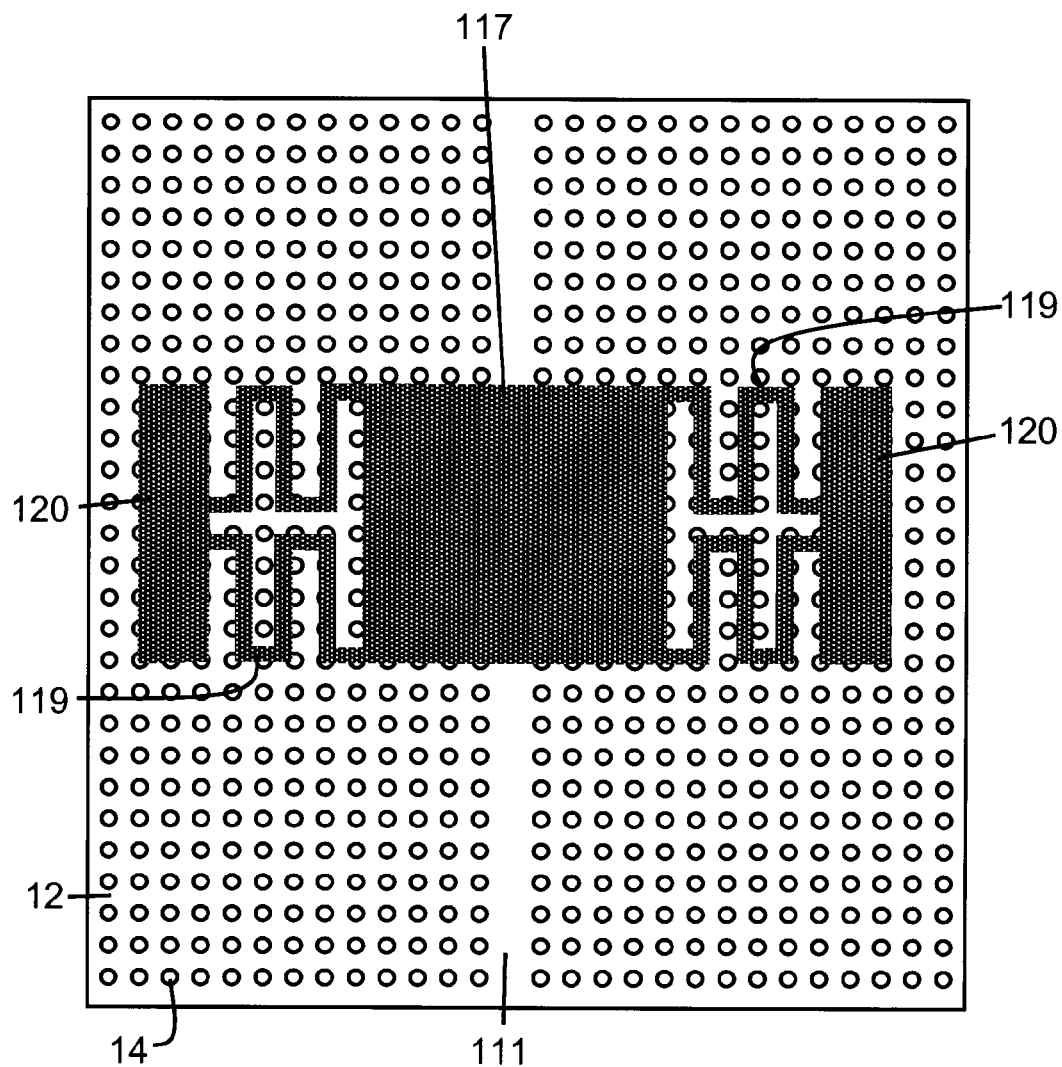
FIG. 19 is a top view of a planar photonic crystal defect waveguide device with a movable slab of material coupled to a MEMS actuator.

One technique for positioning and moving the slab 114 is the use of a mechanical actuator, such as, for example, a microelectromechanical (MEMS) actuator. An example of such a device is shown in FIGS. 17, 18 and 19. FIG. 17 is a side view of the exemplary device in a rest switch state. Built onto a substrate 112 is a ground electrode 115, an underclad layer 116, and a planar photonic crystal 110 having a defect waveguide 111 having an effective refractive index greater than that of the underclad layer 116. Coupled to this is a MEMS device, having a beam 117 with an electrode 118 and the slab 114 deposited thereon. The beam 117 is connected to the substrate 112 through a pair of cantilever arms 119 and a supporting structure 120. A voltage controller 121 is able to place an electric potential between the electrodes 118 and 115. In the rest switch state shown in FIG. 17, wherein substantially no electric potential exists between the electrodes 115 and 118, the slab 114 is outside of the upper clad region 106, so the effective refractive index of the upper clad region 106 is that of air. FIG. 18 shows an actuated switch state wherein an electric potential is placed between the electrodes. In this state, the beam 117 is attracted to the ground electrode 115, moving the slab 114 into the upper clad region 106. The distance of penetration into the upper clad region will depend on the potential difference between the electrodes, as will be appreciated by a person of skill in the art. The cantilever arms are sufficiently flexible to allow the beam to deflect an amount sufficient to bring the slab substantially in contact with the surface, as shown in FIG. 18. As described above, the closer the slab 114 is placed to the top surface of the defect waveguide 111, the larger the perturbation of the defect modes will be. This device may be constructed, for example, by separately fabricating the photonic crystal waveguide and the MEMS structure using procedures familiar to one of skill in the art, followed by mating of the two structures. FIG. 19 shows a top view of the mated structures, with the MEMS structure on top of the photonic crystal waveguide structure. This view shows the cantilevered arms 119 as pairs of S-shaped structures. As the slab 114 may have no features, the alignment tolerance of the mating step is low. Other methods of MEMS device actuation, such as piezoelectric and thermal actuation may be used in this device. The person of skill in the art will appreciate that other art-recognized techniques for building MEMS-waveguide structures may be used advantageously here. As the size of the of the slab 114 is not critical provided it is large enough to encompass the evanescent wave of an optical signal propagating in the defect waveguide 111, larger actuating devices may be used in this invention. For example, a piezoelectric actuator may be used in the device instead of the MEMS actuator described above.

Figure 20:
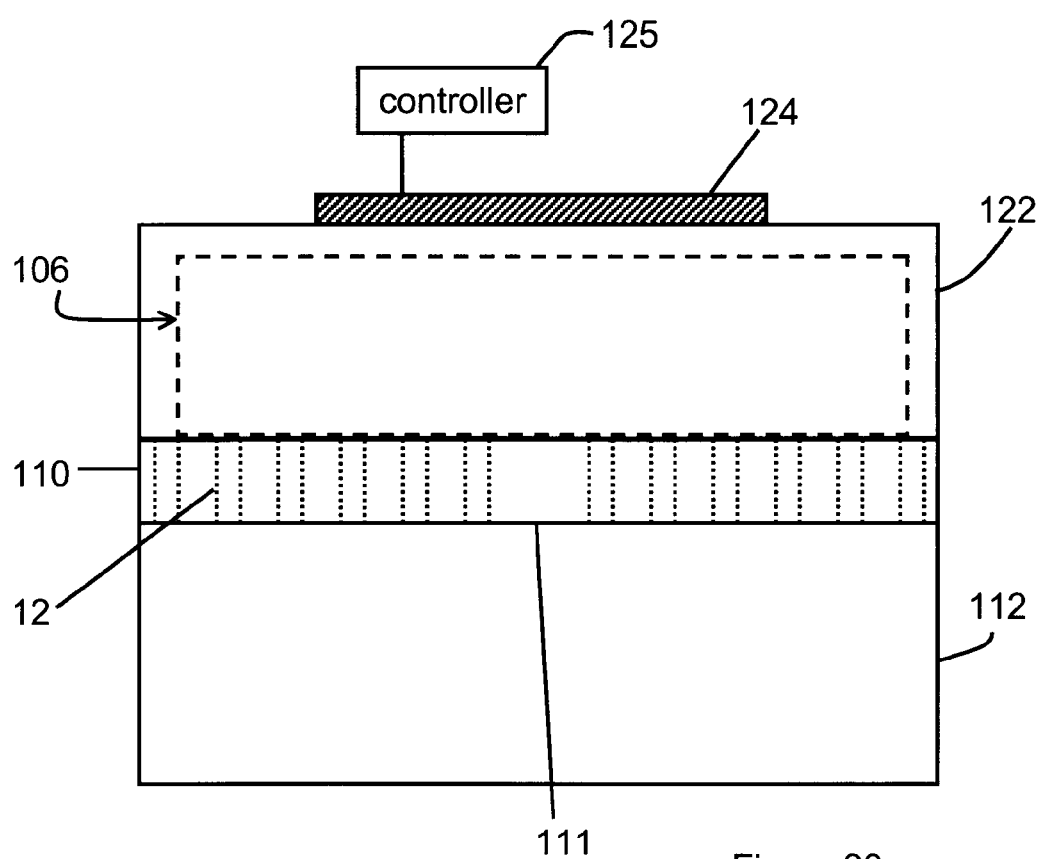
FIG. 20 is a cross-sectional view of a thermo-optic planar photonic crystal defect waveguide device.

An additional embodiment of the invention is shown in FIG. 20. A photonic crystal slab 110 with a defect channel waveguide 111 is formed on an undercladding layer 112, preferably using known semiconductor manufacturing techniques. The undercladding layer 112 is of a lower effective refractive index than the effective refractive index of the planar photonic crystal 110, and may be the substrate, or may be a layer deposited on the substrate. Depending on the fabrication process, the undercladding layer 112 may or may not be patterned with the photonic crystal structure. Here, the lower clad region 104 is completely filled by this undercladding layer 112. A slab of material 122 is fixed in the upper clad region 106, preferably substantially in contact with the top surface of the planar photonic crystal slab. The material of the slab 122 is chosen to have optical properties that may be varied by some means of control. For example, the slab 122 may consist of a material with a substantial thermo-optic coefficient, such as for example a polymer, an inorganic glass, or an organic-inorganic hybrid material. In this case, the means of control would preferably be a heater 124 disposed near the surface of the thermo-optic slab opposite that in contact with the planar photonic crystal slab. The heater 124 is coupled to a suitable controller 125. The heater may be in contact with the slab 122, or may be operatively coupled to the slab 122 through air or some other thermally conductive material. For example, a suitable heater 124 may be constructed by the deposition of a thin layer of metal, such as aluminum, on the thermo-optic layer. Passing a current through the metal will resistively heat the metal, and the heat will be transferred from the heater 124 to the thermo-optic slab 122, changing the effective refractive index of the thermo-optic slab and therefore the propagation of an optical signal in the defect waveguide 111. In an alternative embodiment, the upper clad region is filled with an inert fluid chosen to have substantial thermo-optic coefficient.

Figure 21:
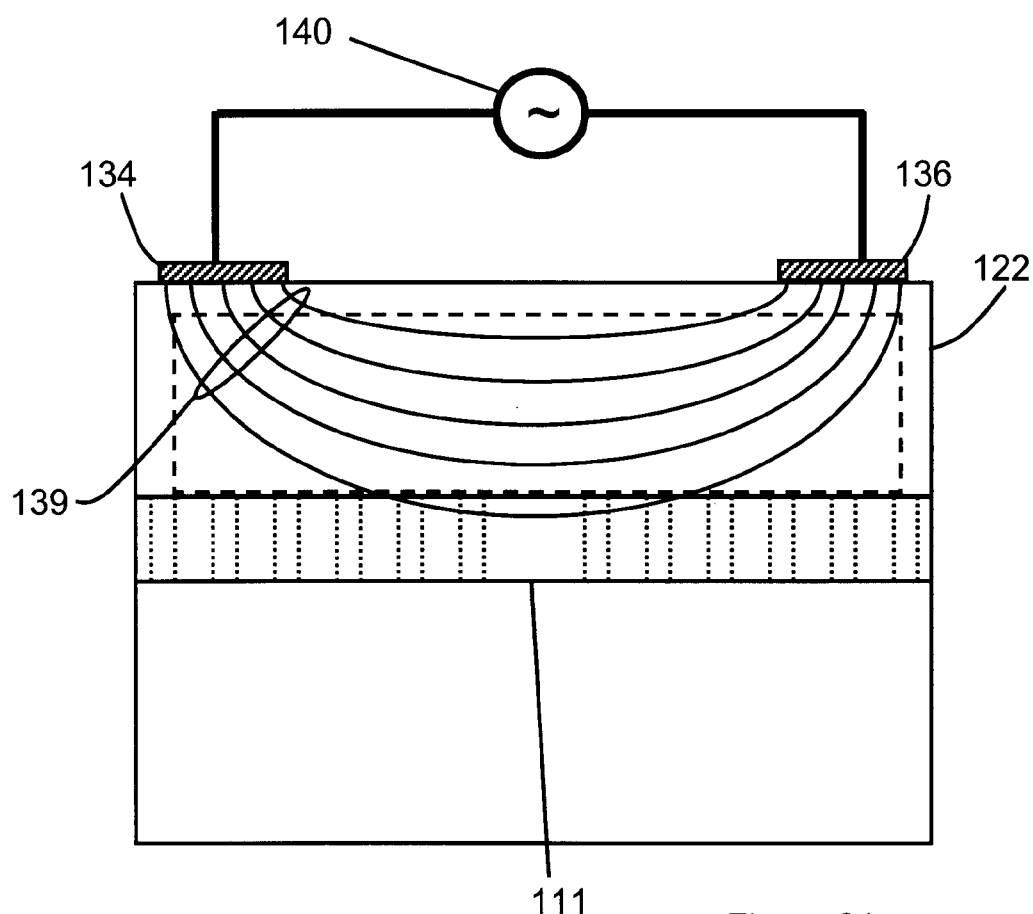
FIGS. 21 and 22 are cross-sectional views of electro-optic planar photonic crystal defect waveguide devices.
Figure 22:
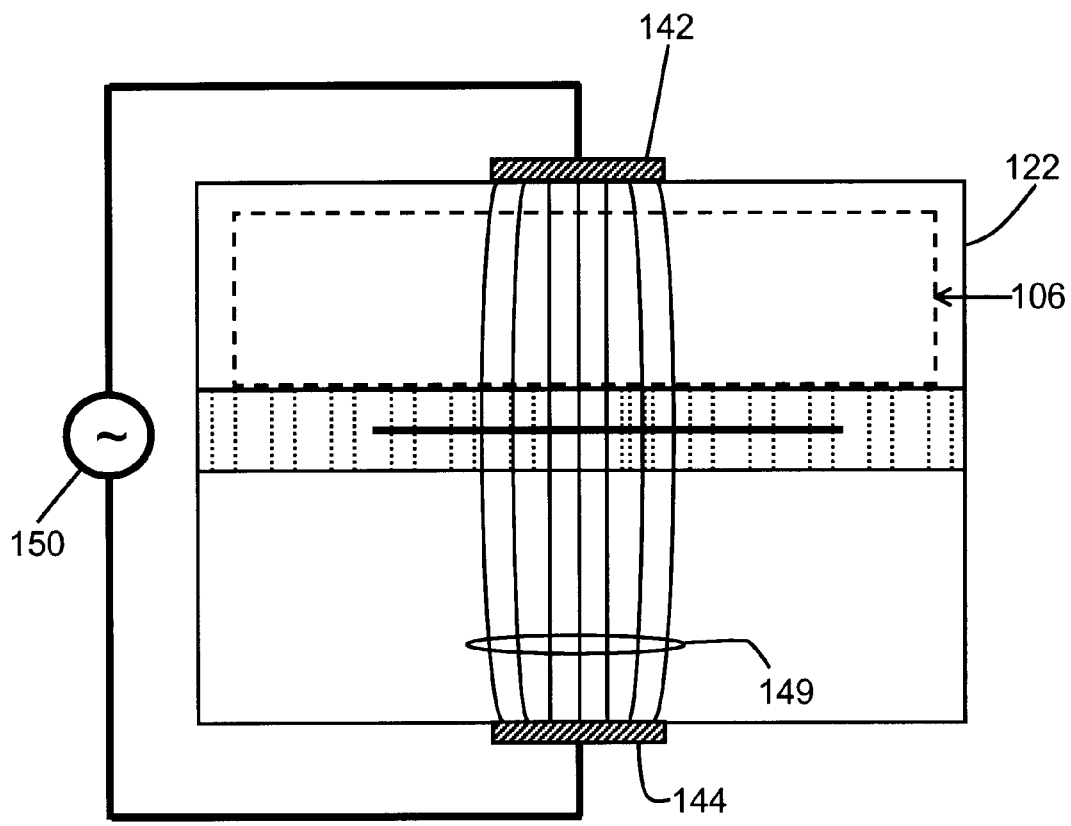

Alternatively, the slab 122 may consist of a material with a substantial electro-optic coefficient, as shown in FIG. 21. Examples of materials with a substantial electro-optic coefficient include lithium niobate, electro-optic polymers, and liquid crystal composites. In the case of an electro-optic material, the means of control would be a pair of electrodes 132 and 134 connected to a voltage source 136 and positioned so as to place an electric field in the upper clad region when the electrodes are biased at different electrical potentials. For example, the electrodes 132 and 134 maybe situated the surface of the electro-optic slab opposite that in contact with the planar photonic crystal slab, with one electrode 132 disposed over a photonic crystal region 136 on one side of the defect waveguide 111, and the other electrode 134 disposed over a photonic crystal region 138 on the other side of the defect waveguide 111. Biasing the electrodes at different electric potentials with a voltage controller 140 coupled to the electrodes 132 and 134 will create an electric field, denoted by the lines 139, in the overclad region. Alternatively, the electrodes may be placed as illustrated in FIG. 22, with a top electrode 142 situated on the surface of the electro-optic slab opposite that in contact with the photonic crystal slab and disposed over the defect waveguide, and a bottom electrode 144 disposed underneath the defect waveguide. Both the top electrode 142 and the bottom electrode 144 are preferably outside of the lower clad region 104 and upper clad region 106. Placing a voltage across the electrodes with a voltage controller 150 coupled to the electrodes 142 and 144 will create an electric field, denoted by the lines 149, in the upper clad region 106. In both examples, the electrodes 132, 142, 134 and 144 may be fabricated from a thin layer of deposited metal such as gold, silver, or chrome; from a conductive oxide such as indium tin oxide; or from a doped semiconductor such as n-doped silicon. One of ordinary skill in the art will realize that the two different electrode configurations exemplified in FIG. 21 and FIG. 22 may be combined in series or in parallel in a device to reduce or enhance effects due to the polarization state of the optical signal. In the devices shown in FIGS. 21 and 22, a voltage is placed across the electrodes, causing the electro-optic slab to change in effective refractive index, thus modifying the propagation of an optical signal in the defect waveguide 111.

Figure 23:
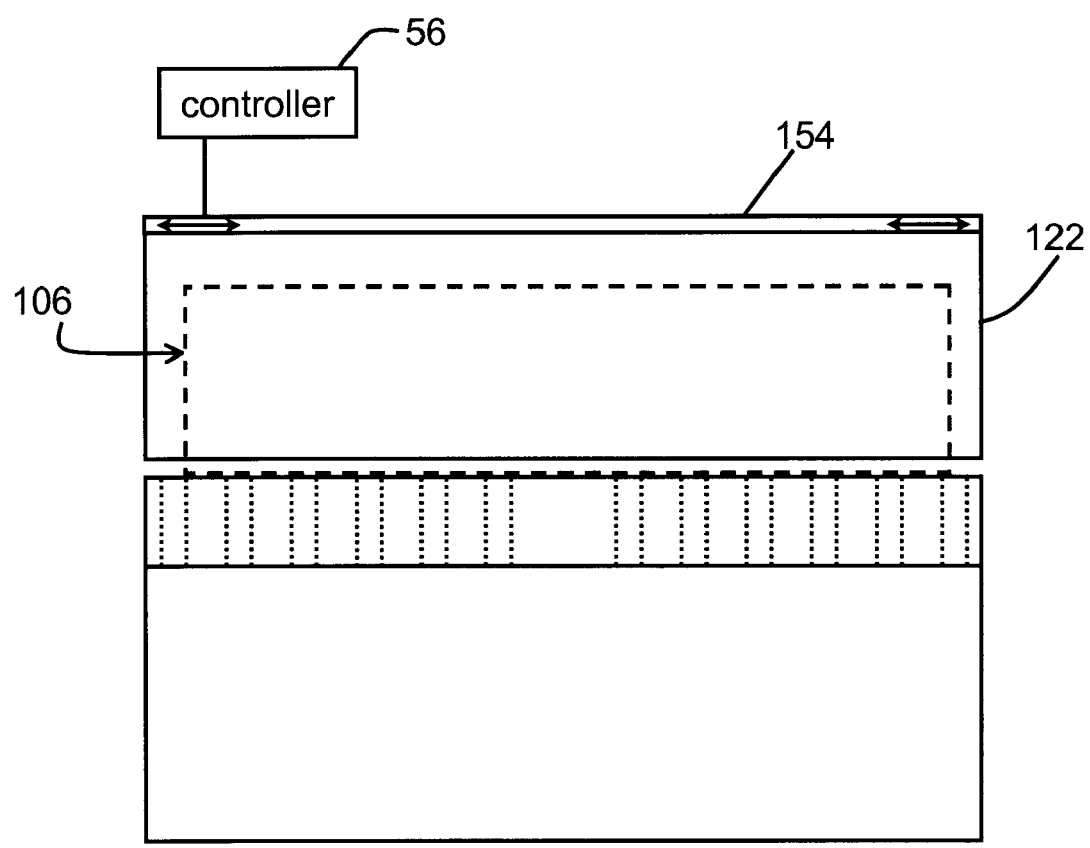
FIG. 23 is a cross-sectional view of a mechano-optic planar photonic crystal defect waveguide device.

Alternatively, the slab 122 may consist of a material with a substantial stress-optic coefficient, as shown in FIG. 23. Materials with a substantial stress-optic coefficient have a substantial change in refractive index when they are subject to a stress, and include, for example, inorganic glasses and polymers, and especially main chain liquid crystalline polymers. The slab 122 is coupled to an actuator 154 that serves to place a stress on the slab of material 122. The actuator 154 is coupled to a controller 156. In this case, the slab 122 is preferably not in direct contact with the planar photonic crystal slab to avoid the mechanical transfer of stress to the planar photonic crystal slab 110 itself, but is as close as possible so as to maximize the volume of the upper clad region 106 that is filled with the slab 122. Alternatively, a material with a substantial mechano-optic coefficient may be employed in the slab 122 of this device. A mechano-optic material undergoes a change in refractive index with a change in dimension. This material may be, for example, a material with a glass transition temperature below 10° C., such as poly(dimethylsiloxane). In both the stress-optic and the mechano-optic case, actuating the material causes a controllable change in effective refractive index of the slab 122, and modifies the propagation of an optical signal in the defect waveguide 111. In both cases, the actuator 154 may be, for example, a piezoelectric actuator.

It will be apparent to those of ordinary skill in the pertinent art that modifications and variations may be made to the controllable planar photonic crystal defect waveguides of the disclosed examples without departing from the spirit or scope of the invention. For example, in the aforementioned examples, it is the effective refractive index of the material in the upper clad region 106 that is controlled to modify the propagation of an optical signal in the defect waveguide. The effective refractive index of the material in the lower clad region 104 may likewise be controlled to effect a modification of optical signal propagation. For example, the substrate itself may be disposed in the lower clad region and may be made of a material with a substantial electro-optic or thermo-optic coefficient. It may also be desirable to control the refractive indices of both the lower clad region 104 and the upper clad region 106 in order to reduce the interaction length necessary for a desired modification of an optical signal. For example, the photonic crystal slab may be disposed between layers of electro-optic or thermo-optic materials. Alternatively, the planar photonic crystal defect waveguide as fabricated may have air in both the upper clad region 106 and the lower clad region 104, and have movable slabs 114 above the upper clad region 106 and below the lower clad region 104 that may be actuated into the clad regions, changing the effective refractive indices of the regions and effecting a modification of an optical signal in the defect waveguide 111. In all cases, the control of the upper clad region 106 and the lower clad region 104 may be independent or concerted. The control of the effective refractive index of the upper clad region 106, the lower clad region 104, or both, may arise from effects other than those disclosed above. For example, a photorefractive effect may be used to control the effective refractive index of the clad regions and thereby effect a change in the propagation in the defect waveguide 111.

Figure 24:
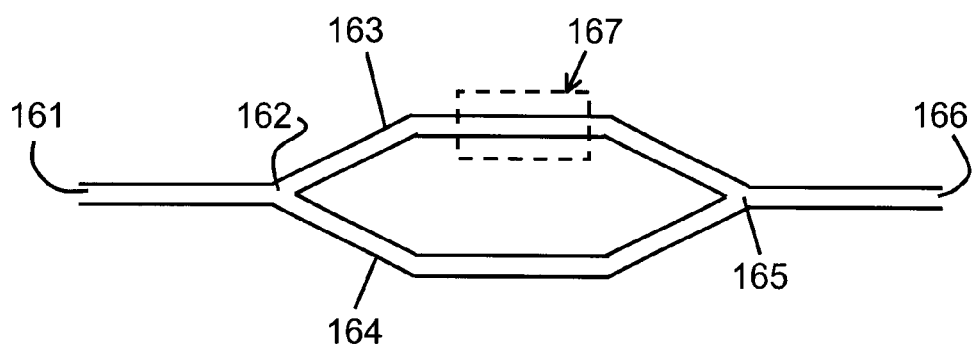
FIG. 24 is a top view of a planar photonic crystal defect waveguide Mach-Zehnder interferometer.

The aforementioned examples have provided a series of planar photonic crystal defect waveguide elements wherein the propagation of an optical signal is controlled by varying the optical properties of the upper clad region 106, the lower clad region 104, or both. As will be understood by the person of ordinary skill in the art, these controllable elements can be combined with other waveguide elements to construct integrated optic devices with a variety of functions. For example, a Mach-Zehnder interferometer device may be constructed with at least one of the arms being contiguous with a controllable region as described in the examples above. An example of such a structure is shown in FIG. 24. In this top view, the boundaries of the photonic crystal defect waveguide are shown by solid lines. A planar photonic crystal defect waveguide structure 160 is provided with an input defect waveguide 161, an optical power splitter 162 at which the input waveguide is separated into a first defect waveguide arm 163 and a second defect waveguide arm 164. An optical power combiner 165 recombines the defect waveguides 163 and 164 into an output defect waveguide 166. While the optical power splitter 162 and combiner 165 are shown here as Y-shaped junctions, the person of skill in the art will recognize that they may also be directional couplers. The second defect waveguide arm 164 is contiguous with a controllable region 167 as disclosed above, which is provided for perturbing the defect mode, thereby varying the optical path length of the second waveguide 164. As is well understood in the art, the difference in optical path length between the waveguides 163 and 164 controls the interference of the optical signals propagating in those waveguides upon recombination, and therefore the intensity of the optical signal in the output waveguide 166.

Figure 25:
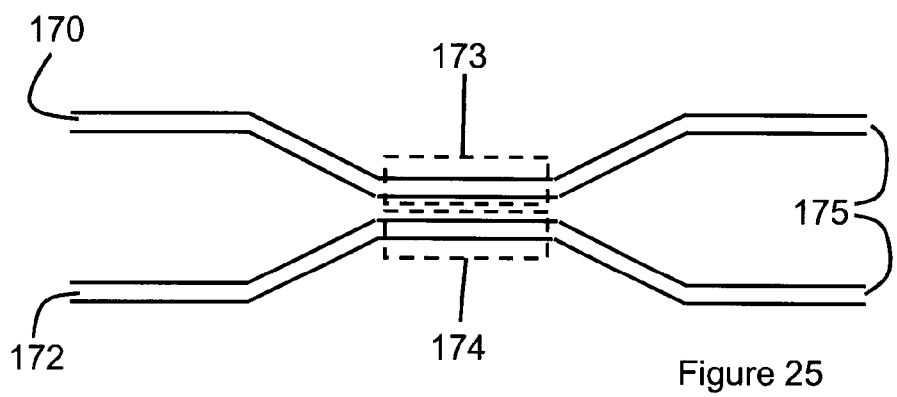
FIG. 25 is a top view of a planar photonic crystal defect waveguide directional coupler.

Another example of an integrated optic device using a controllable photonic crystal waveguide is illustrated in FIG. 25. In this top view, the boundaries of the photonic crystal defect waveguide 111 are shown by solid lines. In this example, a 2×2 switch is made from a pair of defect waveguides 170 and 172 arranged in the well-known directional coupler configuration. In the coupling region, the defect waveguide 170 is contiguous with a controllable region 173, and the defect waveguide 172 is contiguous with a controllable region 174. hi the example of FIG. 17, these waveguides may be controlled, for example, by an electro-optic polymer slab essentially in contact with the photonic crystal slab 110. The controllable regions 173 and 174 may both be controlled by the same means; in this example, an electric field between an electrode above the electro-optic polymer slab and an electrode below the lower clad region serves to modulate the effective refractive index of the electro-optic polymer, and thereby control the coupling ratio between the output waveguides 175.

Figure 26:
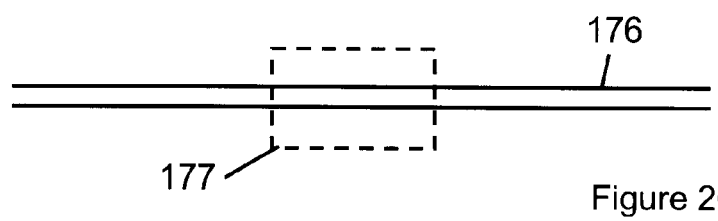
FIG. 26 is a top view of a planar photonic crystal defect waveguide variable optical attenuator.

An exemplary embodiment of a variable optical attenuator is shown in FIG. 26. In this top view, the boundaries of the photonic crystal defect waveguide 111 are shown by solid lines. The variable optical attenuator includes a defect waveguide 176, which is contiguous with a controllable region 177. In this example, the controllable region is contiguous with an area of the bulk planar photonic crystal as well as the defect waveguide. In a rest state (e.g. unactuated MEMS device, no electric field, no heat), the optical signal is prohibited from propagating in the bulk planar photonic crystal, and is thereby confined to the defect waveguide. In an actuated state (e.g. actuated MEMS device, applied electric field, applied heat), the photonic band structure is perturbed, and a fraction of the optical signal is allowed to couple into the bulk photonic crystal, thereby attenuating the optical signal in the defect waveguide. As the person of skill in the art will understand, the attenuation is controlled by the magnitude of the actuation, the photonic crystal structure, and the length of interaction of the defect waveguide 176 and the controllable region 177.

Figure 27:
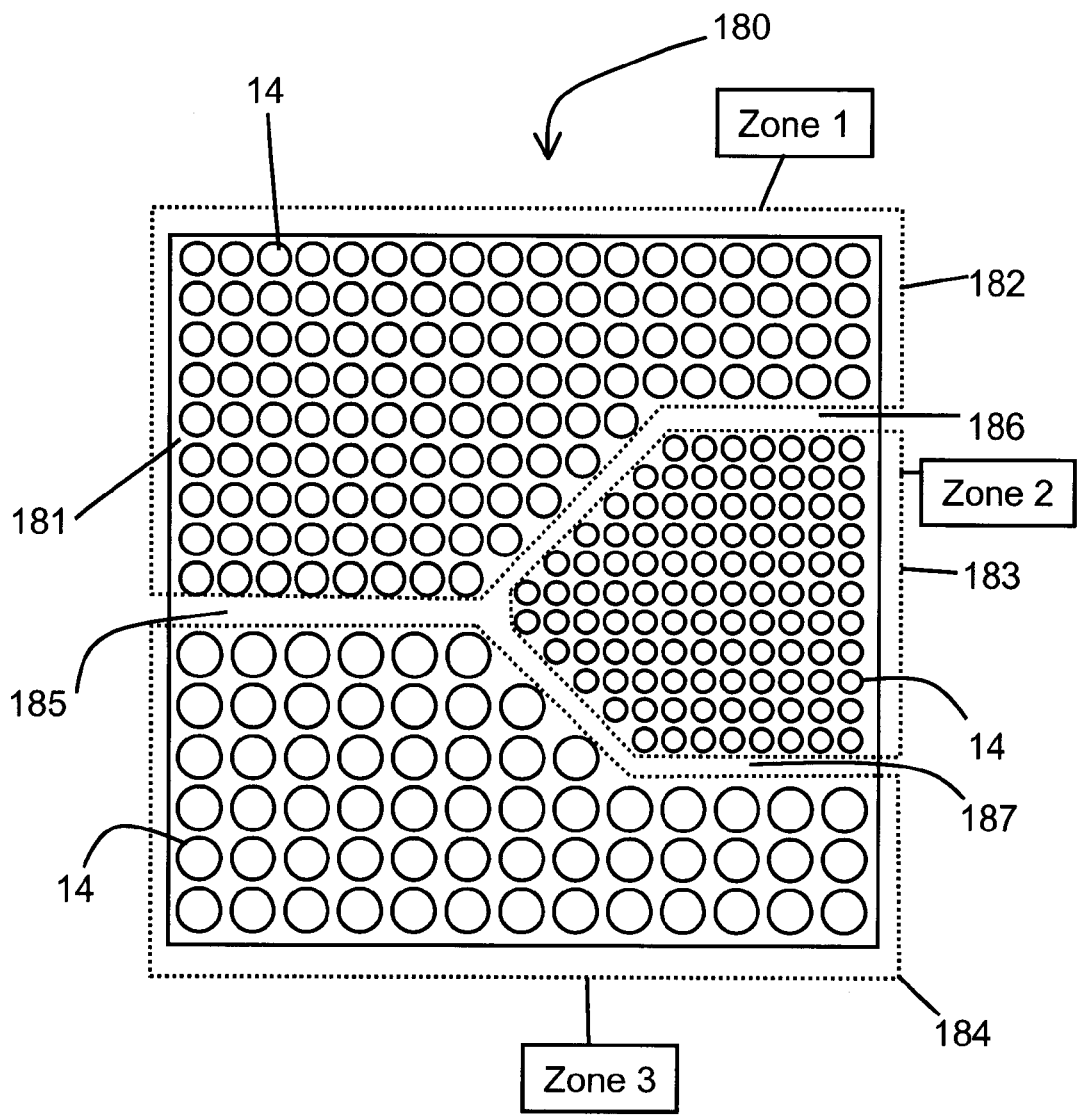
FIG. 27 is a top view of a Y-shaped planar photonic crystal defect waveguide.

Referring now to FIG. 27, a top view of a 1×2 photonic crystal switch 180 is shown in accordance with a preferred embodiment of the present invention. Switch 180 includes a planar photonic crystal slab 181. The planar photonic crystal slab 181 includes a first photonic crystal zone 182, a second photonic crystal zone 183, and a third photonic crystal zone 184. Each of the photonic crystal zones 182, 183 and 184 preferably has different parameters associated therewith, such as the geometry of the crystal structure and/or the index of refraction of the materials forming the photonic crystal lattice in that zone. FIG. 27 further illustrates the differences in geometry in that the cylinders 14 or rods 18 forming the crystal structure in each zone have differing radii and pitch parameters. More specifically, the cylinders 14 in the third zone 184 have the largest radius, the cylinders 14 in the second zone 183 have the smallest radius, and the cylinders 14 in the first zone 182 have a radius between that of the first and third zone cylinders.

The three photonic crystal zones 182, 183 and 184 define a Y-shaped defect waveguide junction which is used in a 1×2 coupler. As shown, the Y-shaped defect waveguide junction includes an input waveguide section 185, a first or upper output waveguide 186, and a second or lower output waveguide 187. Each section of the waveguide is formed by a defect or channel between the photonic crystal structures 182, 183 and 184.

Figure 4:
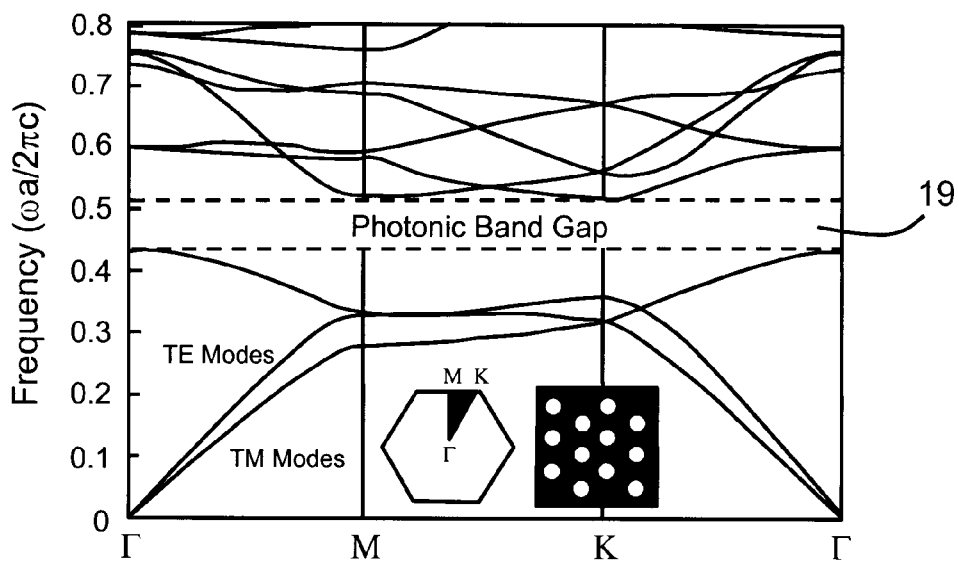
FIG. 4 is a graph showing the band structure of the exemplary prior art two-dimensional photonic crystal structure of FIG. 1.
Figure 5:
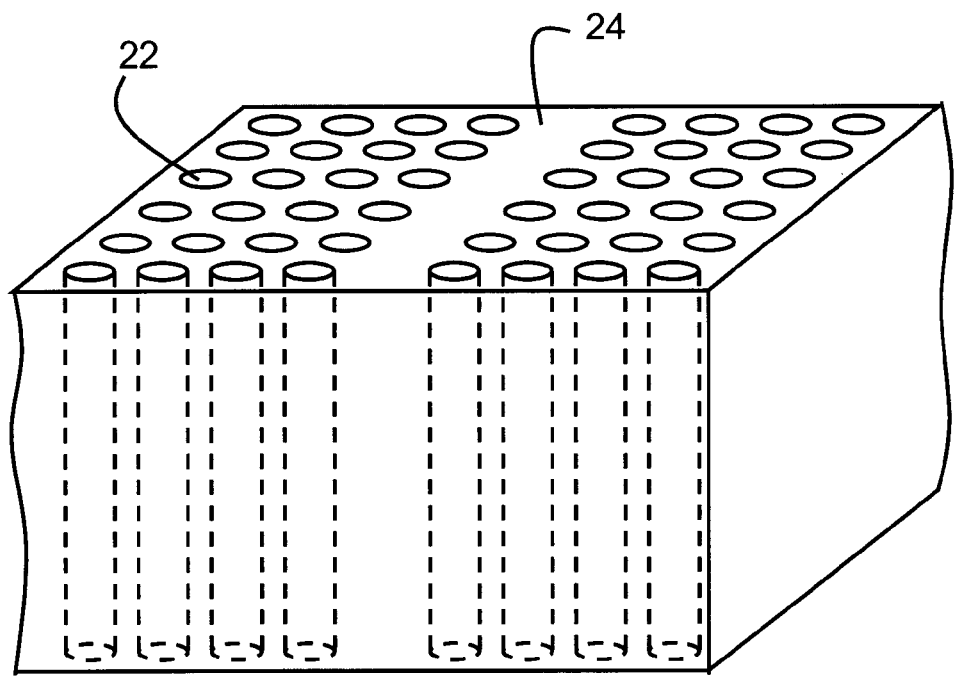
FIG. 5 is a perspective view showing an exemplary prior art two-dimensional photonic crystal structure with a linear defect.
Figure 6:
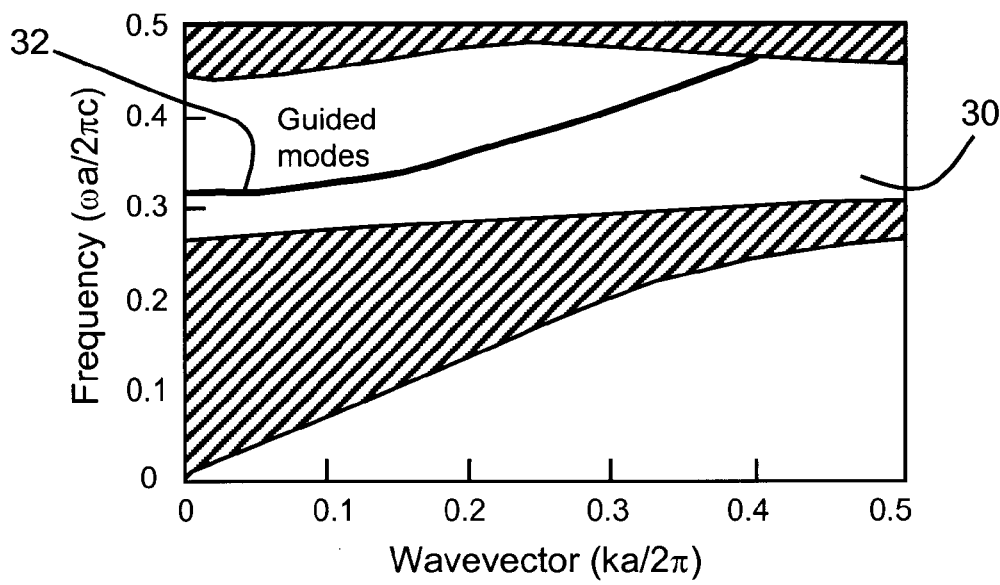
FIG. 6 is a graph showing the band structure of the exemplary prior art two-dimensional photonic crystal structure of FIG. 5.
Figure 7:
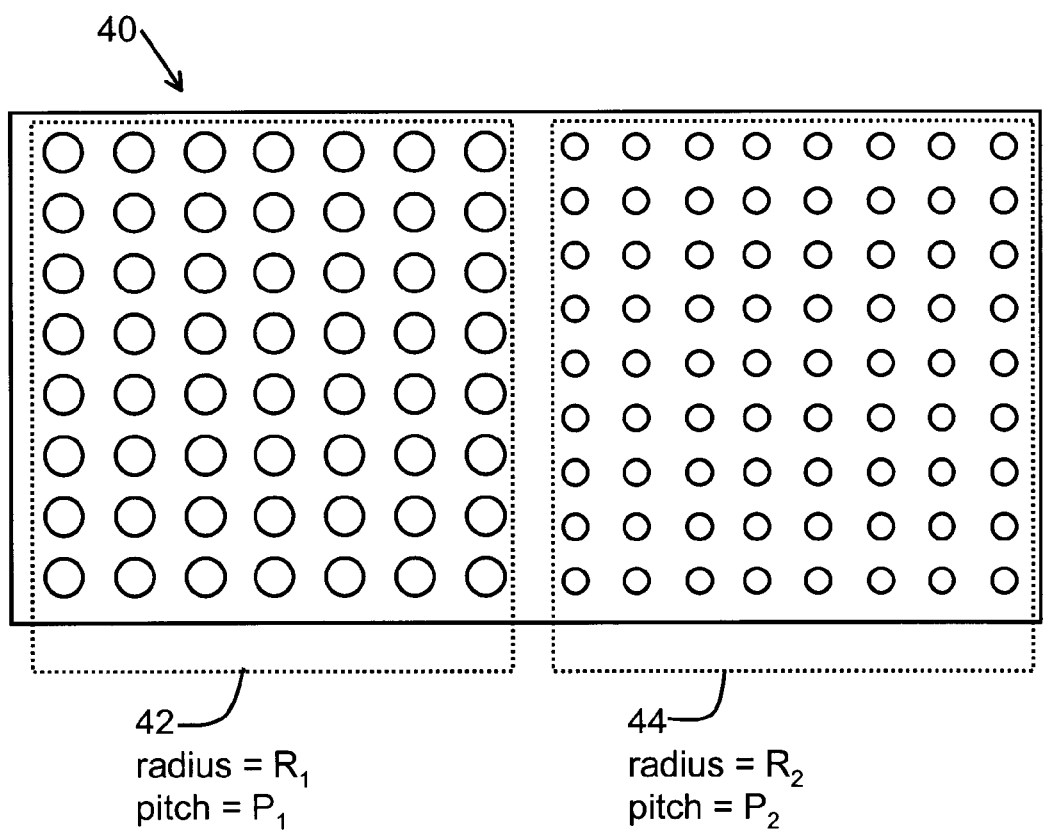
FIG. 7 is a perspective view showing exemplary prior art two-dimensional photonic crystal structures having two different photonic crystal regions separated by a linear defect waveguide.
Figure 8:
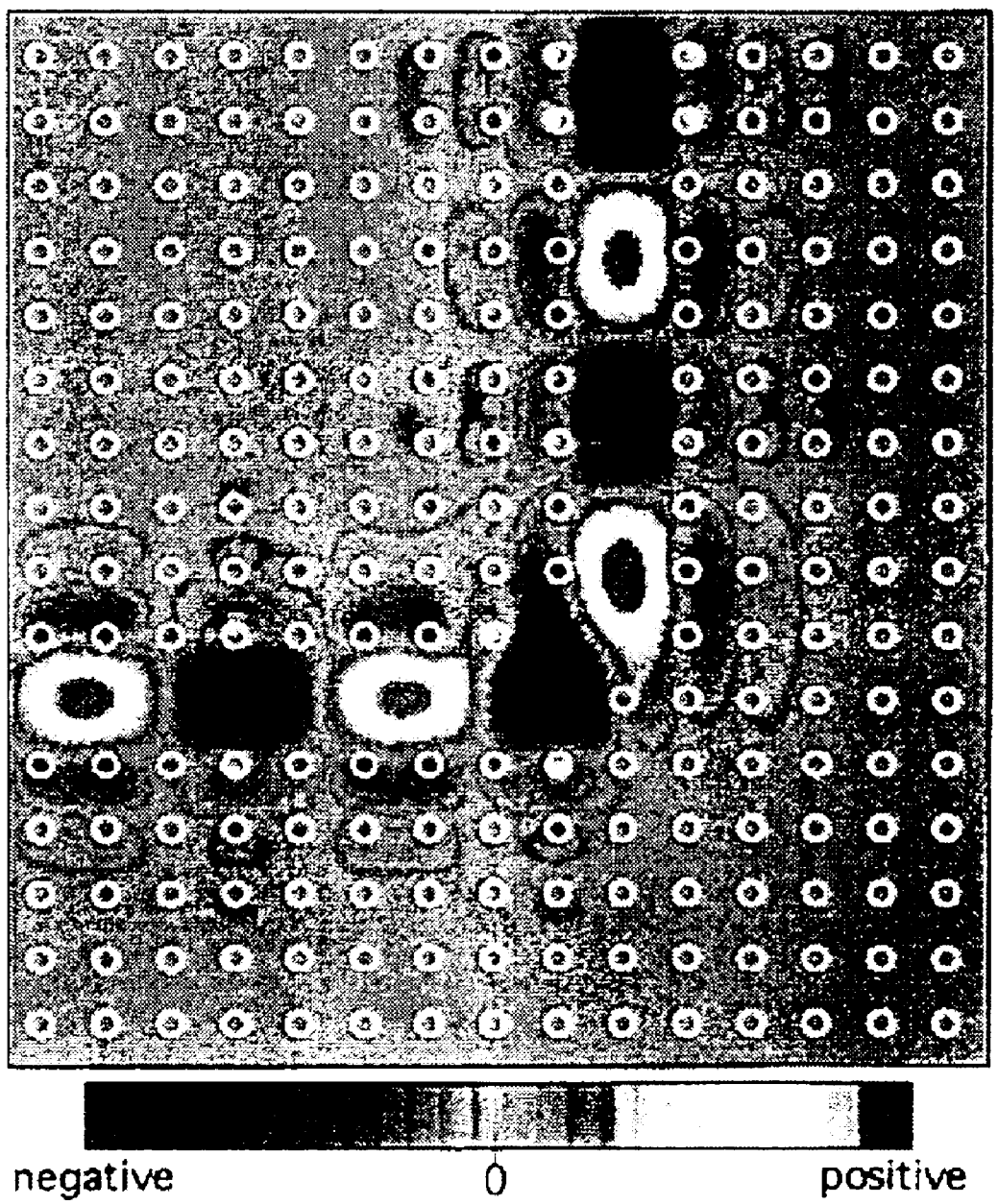
FIG. 8 is a diagram showing propagation of an optical signal through a sharp 90° bend in a prior art two-dimensional photonic crystal defect waveguide.
Figure 9:
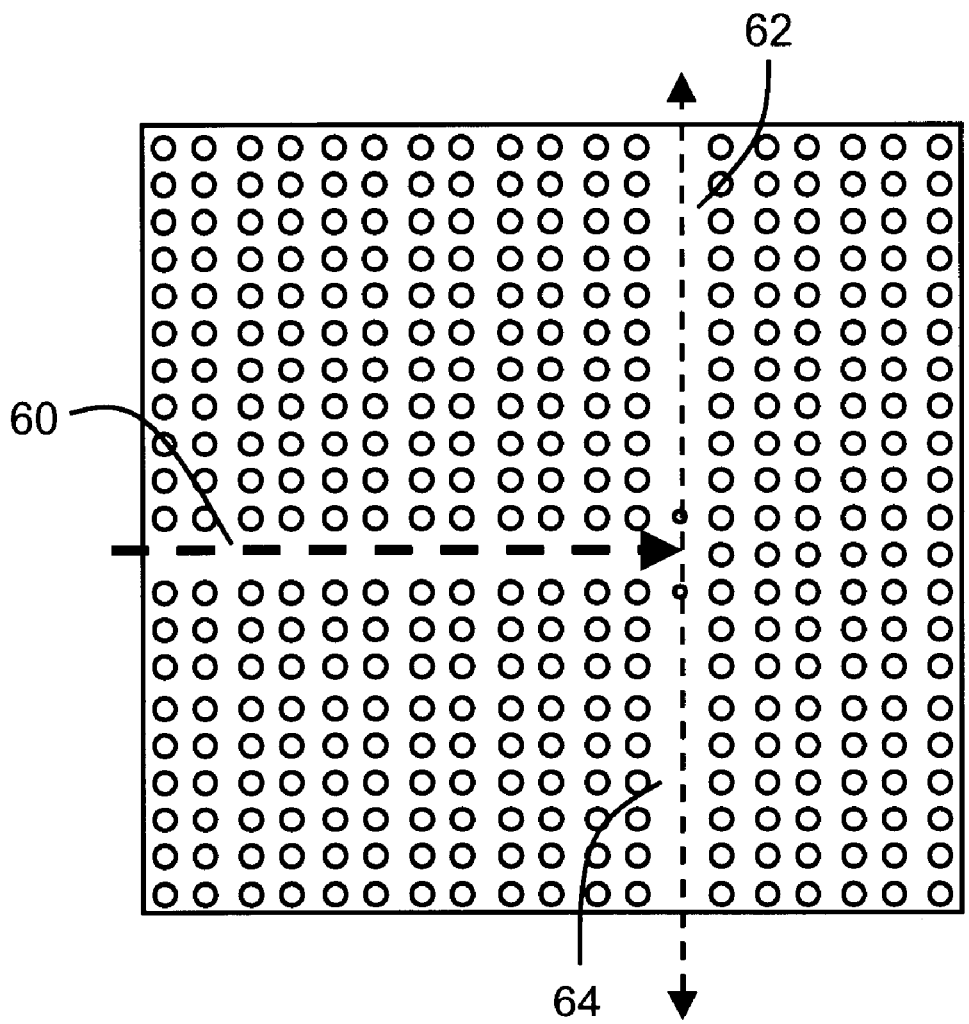
FIG. 9 is a diagram showing propagation of an optical signal through a 180° splitter in a prior art two-dimensional photonic crystal defect waveguide.
Figure 10:
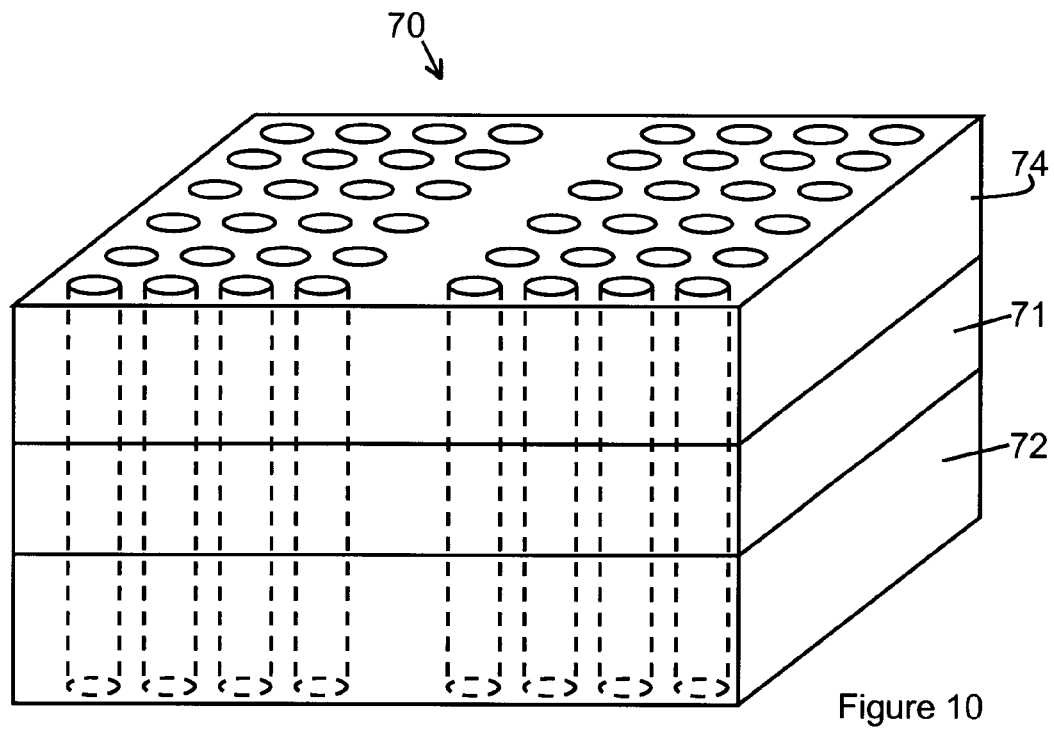
FIG. 10 is a perspective view of a prior art planar photonic crystal defect waveguide with a planar photonic crystal core and photonic crystal underclad and overclad layers.
Figure 11:
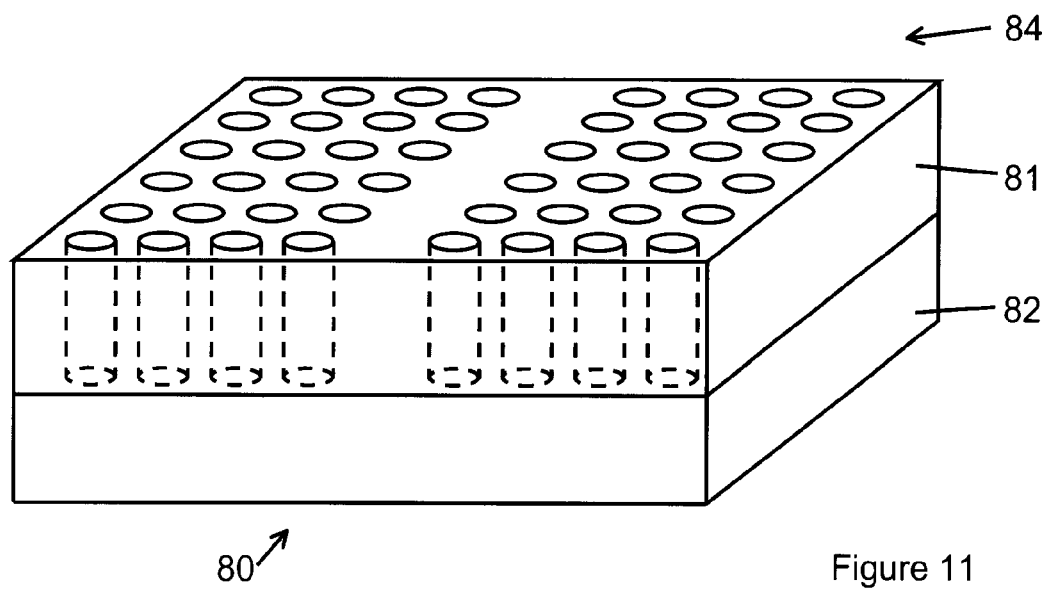
FIG. 11 is a perspective view of a prior art planar photonic crystal defect waveguide with planar photonic crystal core and homogenous underclad and overclad layer.
Figure 12:
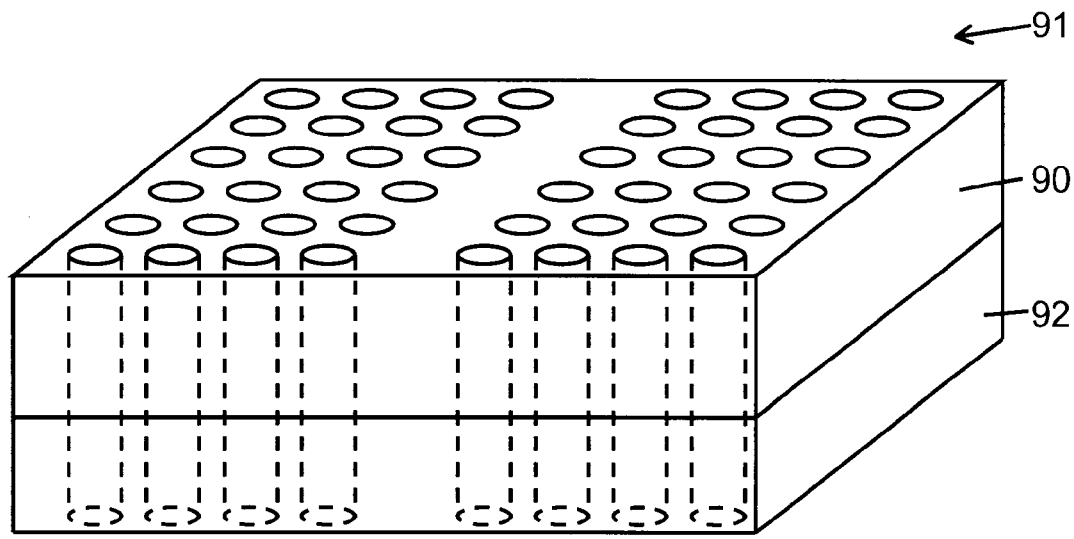
FIG. 12 is a perspective view of a prior art planar photonic crystal defect waveguide with planar photonic crystal core and underclad layer, and a homogeneous overclad layer.
Figure 13:
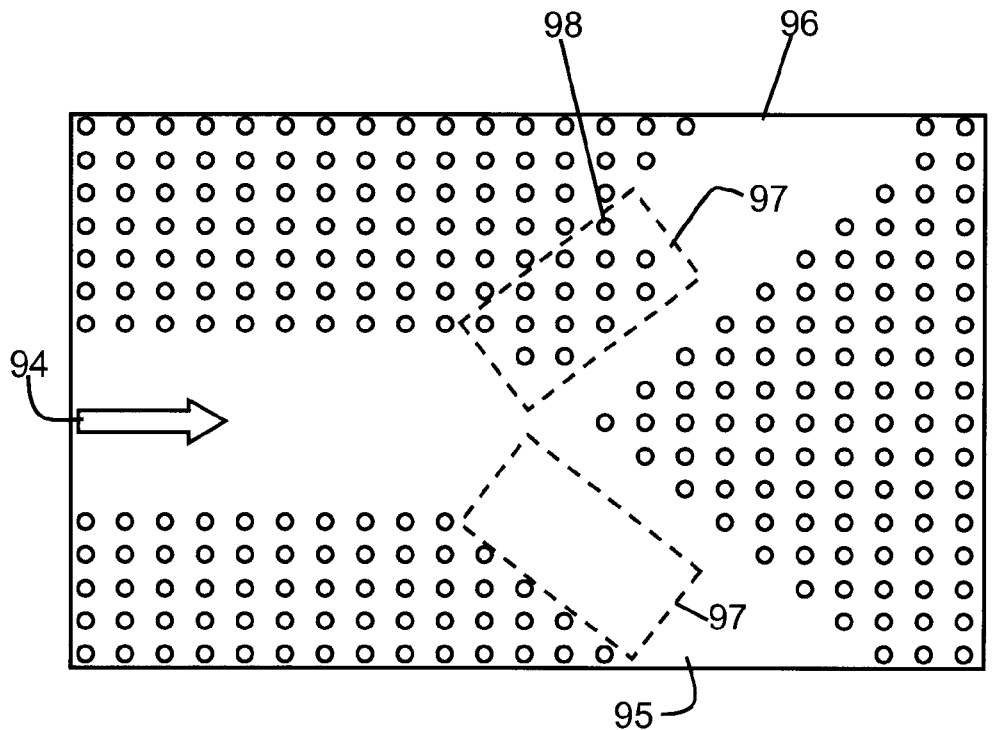
FIG. 13 is a top view of a prior art active planar photonic crystal defect waveguide Y junction.

In this example, the parameters (e.g. geometry, index) of the first photonic crystal zone 182 and the third photonic crystal zone 184 are selected such that an optical signal can always propagate between these zones along the input waveguide section 185. More specifically, this is accomplished by creating a defect band in the frequency vs. wave vector band diagram associated with the structure. An example is that shown in association with FIG. 4. Additionally, some or all of the zones 182, 183 and 184 have parameters that can be switched from a first value to a second value for similarly creating a defect mode that can be alternately switched for the first output waveguide 186 and the second output waveguide 187. As such, when an optical signal is allowed to propagate along the first output waveguide 186, the optical signal is prohibited from propagating along the second output waveguide 187. Conversely, when an optical signal is allowed to propagate along the second output waveguide 187, an optical signal is prohibited from propagating along the first output waveguide 186. As will be appreciated, by changing the defect mode, an optical signal traveling along the input waveguide 185 can be alternately switched between one of the first output waveguide 186 and the second output waveguide 187 for creating a 1×2 optical switching device.

Figure 28:
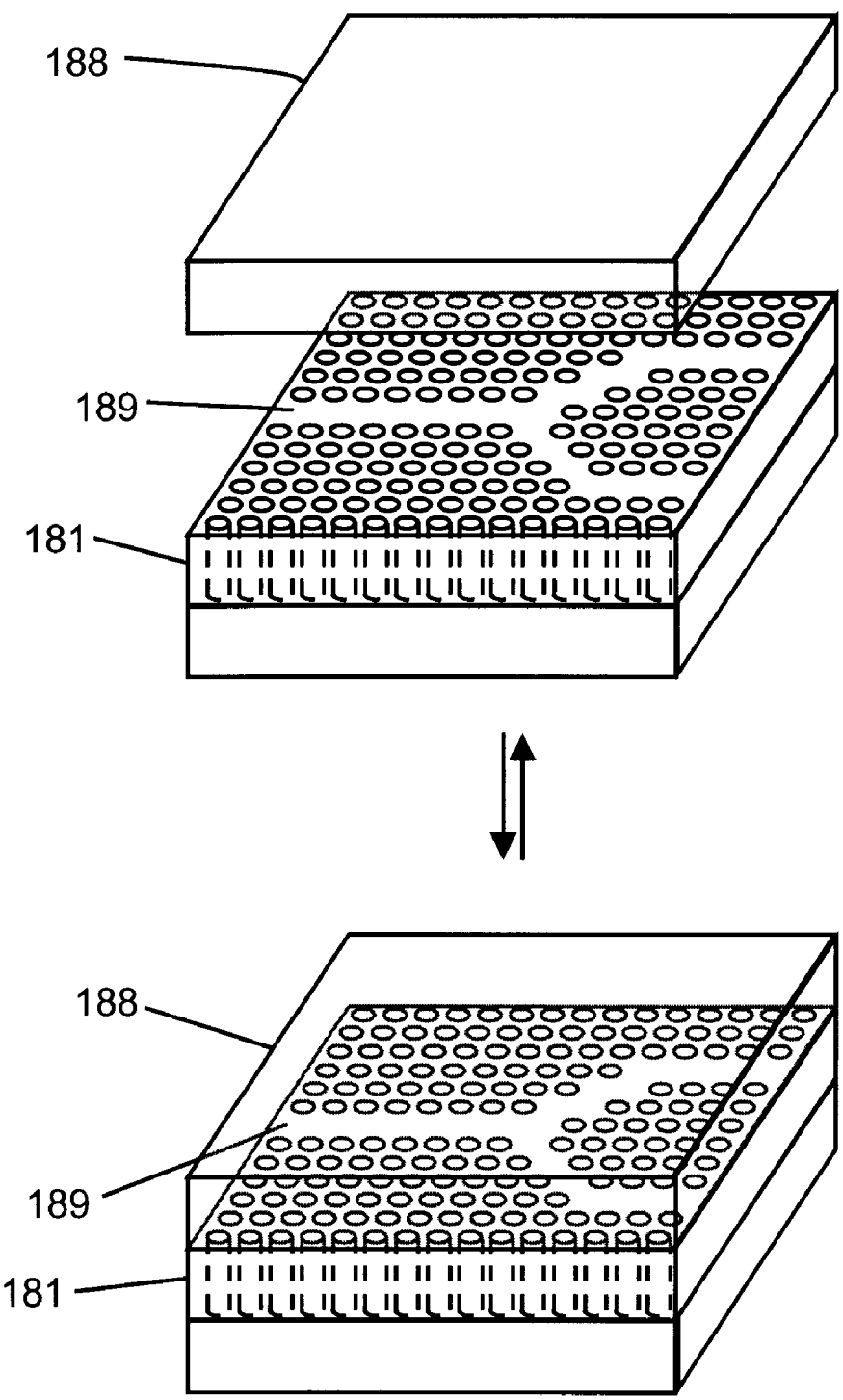
FIG. 28 is a perspective view of a planar photonic crystal defect waveguide 1×2 switch with a movable slab of mate-

The defect mode may be changed in a variety of ways, such as by changing the defect mode associated with one or more of the defect waveguides 185, 186 and 187. One technique for changing the defect mode is to position a slab 188 of material over the top surface 189 of the planar photonic crystal structure 181. The material of the slab 188 may be any material with a desired effective refractive index, for example doped silica, undoped silica, silicon, a polymeric organic material, a organic/inorganic hybrid material, an inorganic glass, and III–V semiconductor materials such as gallium arsenide. As shown in the rest switch state of FIG. 28, when the slab 188 is separated from the top surface 189 so as to be outside of the upper clad region 106, a first defect mode is created, and an optical signal will propagate for example only through the first output waveguide 186. As shown in the actuated switch state of FIG. 28, when the slab 188 is placed very near or in contact with the top surface 189 so as to substantially fill the upper clad region 106, a second defect mode is created, and light will propagate for example only through the second output waveguide 187. It will be appreciated that positioning the slab so as to only partially fill the upper clad region 106 may route only a portion of the optical signal to the first output waveguide 186, with the balance of the optical signal being routed to the second optical waveguide. It will also be appreciated that the controllable region is contiguous with at least one of the defect waveguides 185, 186, and 187. One technique contemplated for positioning and moving the slab 188 is the use of a microelectromechanical (MEMS) actuator, as described in connection with FIGS. 17 and 18. As disclosed above, other actuators may be used. As such, the actuation of the slab 188 controls the switching function of the 1×2 optical switch 180. As is appreciated by one of skill in the art, the effective refractive index of the upper clad region 106 may alternatively be changed by many the other methods disclosed herein.

It will be apparent to those of ordinary skill in the pertinent art that the devices described in the above examples may be modified to be operative through control of the upper clad region 106, the lower clad region 104, or both clad regions 104 and 106 without departing from the spirit or the scope of this invention. It will likewise be apparent to those of ordinary skill that other devices dependent on modification of the propagation characteristics of a planar photonic crystal defect waveguide by a change in the optical properties of the upper clad region 106, the lower clad region 104, or both may be contemplated without departing from the spirit or scope of the invention.

As described above and understood by the skilled artisan, the function of a planar photonic crystal defect waveguide device is highly dependent on the wavelengths of the optical signal propagating therethrough. This property may be used advantageously in connection with this invention to make devices with wavelength-dependent functionality. For example, the variable optical attenuator of FIG. 26 may be designed to attenuate a first wavelength of an optical signal, while leaving a second wavelength undisturbed. These devices may be designed using the calculation methods known in the art as well as those described in the Optics Communications paper incorporated by reference herein.

As previously noted, the optical devices of the present invention may be employed for implementing a variety of optical switching functions in an optical communication system, including optical fiber communications switching modules and equipment, optical computing, optical sensor arrays, antennae arrays, and other applications where optical waveguides, optical fibers, or other guided or partially-guided light signal transmission media are utilized to route light signals for voice, data, and other information-carrying purposes.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical device for controlling an optical signal comprising:
    a planar photonic crystal structure;
    a defect waveguide formed in the planar photonic crystal structure for the
    propagation of the optical signal, the defect waveguide having a top surface and a bottom surface;
    an upper clad region contiguous with the top surface of the defect waveguide; and
    a lower clad region contiguous with the bottom surface of the defect waveguide, wherein at least one of the upper clad region or the lower clad region is a controllable region having a controllable optical property sufficient to modify the optical signal.

2. The optical device of claim 1 wherein the optical property of at least one of the upper clad region and the lower clad region is controllable by varying the temperature of a material therein.

3. The optical device of claim 2 wherein the material is selected from the group consisting of a polymer, an inorganic glass, an organic-inorganic hybrid material and an inert fluid.

4. The optical device of claim 2 wherein the material is selected from the group consisting of a polymer, an organic-inorganic hybrid, and an inert fluid.

5. The optical device of claim 1 further comprising:
    a thermo-optic material disposed in the controllable region; and
    a heater coupled to the thermo-optic material.

6. The optical device of claim 1 wherein the optical property of at least one of the upper clad region or the lower clad region is controllable by varying the intensity of an electric field in a material in the controlled region.

7. The optical device of claim 6 wherein the material is selected from a group consisting of an electro-optic polymer, lithium niobate, and a liquid crystal composite material.

8. The optical device of claim 1 further comprising:
    an electro-optic material positioned in the controllable region;
    a first electrode;
    a second electrode; and
    a voltage controller coupled to the electrodes,
    wherein the electrodes are positioned so that when biased at different electrical potentials with the voltage controller, an electric field is created in the controllable region.

9. The optical device of claim 1 wherein the optical property of at least one of the upper clad region or the lower clad region is controllable by varying the stress on a material therein.

10. The optical device of claim 9 wherein the material is a main chain liquid crystal polymer.

11. The optical device of claim 1 wherein the optical property of at least one of the upper clad region or the lower clad region is controllable by varying a dimension of a material therein.

12. The optical device of claim 11 wherein the material is a polymeric material with a glass transition temperature below 10° C.

13. The optical device of claim 1 further comprising:
a stress-optic material positioned in the controllable region; and
an actuator coupled to the material,
wherein the actuator is able to place a stress on the stress-optic material.

14. The optical device of claim 1 further comprising:
a mechano-optic material positioned in the controllable region; and
an actuator coupled to the material,
wherein the actuator is able to change at least one dimension of the mechano-optic material.

15. The optical device of claim 1 wherein the optical property of at least one of the upper clad region or the lower clad region is controllable by varying the position of a slab of material in the region.

16. The optical device of claim 15 wherein fine control of the optical signal is achieved by adjusting the position of the slab of material in the controllable region.

17. The optical device of claim 15 wherein the material is selected from the group consisting of doped silica, undoped silica, silicon, a polymeric organic material, a organic/inorganic hybrid material, an inorganic glass, and a III–V semiconductor material.

18. The optical device of claim 1 further comprising:
a slab of material; and
an actuator,
wherein the actuator is able to change the position of the material between a position substantially inside of the controllable region and a position substantially outside of the controllable region.

19. The optical device of claim 1 wherein the planar photonic crystal structure is formed on a substrate, the planar photonic crystal structure including a matrix of cylinders disposed in a background matrix formed on the substrate.

20. The optical device of claim 1 wherein the planar photonic crystal structure is lithographically patterned and etched in a material selected from the group consisting of doped silica, undoped silica, silicon, a polymeric organic material, a organic/inorganic hybrid material, an inorganic glass, and a III–V semiconductor material.

21. The optical device of claim 1 wherein the defect waveguide is configured as a Mach-Zehnder interferometer, the Mach-Zehnder interferometer having an input defect waveguide, an optical power splitter, a first defect waveguide arm, a second defect waveguide arm, a power combiner, an optical power combiner, and an output defect waveguide.

22. The optical device of claim 21 wherein the region of controllable optical properties is contiguous with one of the defect waveguide arms of the Mach Zehnder interferometer.

23. The optical device of claim 1 wherein the defect waveguide is configured as a directional coupler having a coupling region including two defect waveguides.

24. The optical device of claim 23 wherein the controllable is contiguous with at least one of the defect waveguides of the coupling region of the directional coupler.

25. The optical device of claim 1 wherein the defect waveguide is configured as a Y-shaped defect waveguide junction with an input defect waveguide section, a first output defect waveguide section, and a second output defect waveguide section.

26. The optical device of claim 25 wherein the Y junction is defined as a defect between three different photonic crystal regions with different lattice parameters.

27. The optical device of claim 25 wherein controlling the optical properties of at least one of the upper clad region and the lower clad region serves to route a controllable fraction of the optical signal from the input section to the first output section, with the remainder of the optical signal being routed from the input section to the second output section.

28. The optical device of claim 27 wherein the region of controllable optical properties is contiguous with at least one of the first output defect waveguide section or the second output defect waveguide section.

29. The optical device of claim 1 further comprising a controller coupled to at least one of the upper clad region or the lower clad region, the controller being operative to change the controllable optical property.

30. A method for controlling an optical signal comprising the steps of:
providing an optical device having
a planar photonic crystal structure having a top surface and a bottom surface,
a defect waveguide formed in the planar photonic crystal structure for the propagation of the optical signal,
an upper clad region contiguous with the top surface of the defect waveguide, and
a bottom lower clad region contiguous with the bottom surface of the defect waveguide;
launching the optical signal into the defect waveguide of the optical device; and
controlling an optical property of at least one of the upper clad region or the lower clad region so as to effect a change in the propagation of the optical signal in the defect waveguide.

31. The method of claim 30 wherein the optical property of at least one of the upper clad region or the lower clad region is controlled by varying the temperature of a thermo-optic material therein.

32. The method of claim 30 wherein the optical property of at least one of the upper clad region or the lower clad region is controlled by varying the electric field intensity in an electro-optic material therein.

33. The method of claim 30 wherein the optical property of at least one of the upper clad region or the lower clad region is controlled by varying the stress on a material therein.

34. The method of claim 30 wherein the optical property of at least one of the upper clad region or the lower clad region is controlled by varying the dimensions of a mechano-optic material therein.

35. The method of claim 30 wherein the optical property of at least one of the upper clad region or the lower clad region is controlled by varying the position of a slab of material therein.

36. The method of claim 30 wherein the optical device further comprises a controller coupled to at least one of the upper clad region or the lower clad region, the controller being operative to change the controllable optical property.

* * * * *